(12) United States Patent
Ohta

(10) Patent No.: US 7,924,264 B2
(45) Date of Patent: Apr. 12, 2011

(54) INFORMATION PROCESSING APPARATUS AND STORAGE MEDIUM STORING INFORMATION PROCESSING PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1114 days.

(21) Appl. No.: 11/656,939

(22) Filed: Jan. 24, 2007

(65) Prior Publication Data

US 2008/0125223 A1 May 29, 2008

(30) Foreign Application Priority Data

Nov. 29, 2006 (JP) ................. 2006-321428

(51) Int. Cl.
*G06F 3/33* (2006.01)
(52) U.S. Cl. ......... 345/157; 345/158; 345/162; 345/169
(58) Field of Classification Search .................. 345/162, 345/169, 204, 156–158, 173–175, 419, 427, 345/672, 698; 463/36, 37, 39, 43, 46, 17, 463/18, 22, 26, 29, 31, 42, 461; 340/573.1; 702/150; 244/3.21; 348/62, 207.1, 333.02
See application file for complete search history.

(56) References Cited

U.S. PATENT DOCUMENTS

| | | | | |
|---|---|---|---|---|
| 4,817,950 A | * | 4/1989 | Goo | ............................... 463/36 |
| 4,899,956 A | * | 2/1990 | King et al. | ................... 244/3.21 |
| 5,574,479 A | | 11/1996 | Odell | |
| 5,627,565 A | | 5/1997 | Morishita et al. | |
| 6,343,234 B1 | * | 1/2002 | Thomas | ........................... 700/28 |
| 6,408,087 B1 | * | 6/2002 | Kramer | ......................... 382/124 |
| 6,425,525 B1 | * | 7/2002 | Swaminathan et al. | ...... 235/385 |
| 6,611,783 B2 | * | 8/2003 | Kelly et al. | .................... 702/150 |
| 6,803,906 B1 | * | 10/2004 | Morrison et al. | ............. 345/173 |
| 6,982,697 B2 | | 1/2006 | Wilson et al. | |
| 7,139,983 B2 | | 11/2006 | Kelts | |
| 7,158,118 B2 | | 1/2007 | Liberty | |
| 7,262,760 B2 | | 8/2007 | Liberty | |

(Continued)

FOREIGN PATENT DOCUMENTS

JP 2005-253724 9/2005

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner* — Prabodh M Dharia
(74) *Attorney, Agent, or Firm* — Nixon & Vanderhye P.C.

(57) ABSTRACT

An information processing apparatus can communicate with an input device comprising an image capturing means for capturing an image of a target object, and calculates a pointing position on a screen of a display device based on the image captured by the image capturing means. The input device comprises a motion detecting means for detecting a motion of the input device. The information processing apparatus calculates a tilt value indicating a tilt of the input device using a result of detection by the motion detecting means. It is determined whether or not the pointing position can be calculated based on the image captured by the image capturing means. When it is determined that the pointing position cannot be calculated, the calculated tilt value is compared with a predetermined reference value. The user is notified of information about the tilt of the input device, depending on a result of the comparison.

23 Claims, 15 Drawing Sheets

U.S. PATENT DOCUMENTS

| | | | |
|---|---|---|---|
| 7,292,151 B2 | 11/2007 | Ferguson et al. | |
| 7,414,611 B2 | 8/2008 | Liberty | |
| 7,460,110 B2 * | 12/2008 | Ung et al. | 345/173 |
| 7,489,249 B2 * | 2/2009 | Better et al. | 340/573.1 |
| 2001/0050672 A1 * | 12/2001 | Kobayashi | 345/158 |
| 2004/0012573 A1 * | 1/2004 | Morrison et al. | 345/173 |
| 2004/0046736 A1 | 3/2004 | Pryor et al. | |
| 2005/0041016 A1 * | 2/2005 | Howard | 345/158 |
| 2005/0119036 A1 | 6/2005 | Albanna et al. | |
| 2005/0210418 A1 | 9/2005 | Marvit et al. | |
| 2006/0125789 A1 * | 6/2006 | Tu et al. | 345/158 |
| 2006/0129933 A1 * | 6/2006 | Land et al. | 715/723 |
| 2006/0137198 A1 * | 6/2006 | Cato | 33/366.24 |
| 2006/0152489 A1 | 7/2006 | Sweetser et al. | |
| 2006/0178212 A1 | 8/2006 | Penzias | |
| 2007/0191112 A1 * | 8/2007 | Ohta | 463/43 |
| 2007/0265088 A1 * | 11/2007 | Nakada et al. | 463/37 |
| 2008/0268956 A1 * | 10/2008 | Suzuki | 463/37 |
| 2008/0300055 A1 * | 12/2008 | Lutnick et al. | 463/39 |
| 2009/0146953 A1 * | 6/2009 | Lou et al. | 345/163 |
| 2009/0253130 A1 * | 10/2009 | Yoo | 435/6 |

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38; 2002.

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

Wikipedia: "Wii", Nov. 19, 2006, XP002589649 retrived from the Internet: URL:http://en/wikipedia.org/iwiki/Wii.

European Search Report dated Jul. 15, 2010 in related European Patent Application No. 07002612.

* cited by examiner

INFORMATION PROCESSING APPARATUS AND STORAGE MEDIUM STORING INFORMATION PROCESSING PROGRAM

CROSS REFERENCE TO RELATED APPLICATION

The disclosure of Japanese Patent Application No. 2006-321428, filed Nov. 29, 2006, is incorporated herein by reference.

TECHNICAL FIELD

The exemplary embodiments disclosed herein relate to an information processing apparatus and an information processing program. More particularly, the exemplary embodiments disclosed herein relate to an information processing apparatus in which a user performs an input operation using an input device comprising an image capturing device, and an information processing program.

BACKGROUND AND SUMMARY

Conventionally, there is a game apparatus described in Japanese Laid-Open Patent Publication No. 2005-253724 (hereinafter referred to as Patent Document 1) as an example of an apparatus in which a user performs an input operation using an input device comprising an image capturing device. The game apparatus is a shooting game apparatus in which a gunfight is performed against an enemy displayed on a screen. A gun unit (input device) includes a CCD camera. The CCD camera captures an image of surroundings of markers (light emitting diodes) provided at the screen. Data of the image captured by the CCD camera is transmitted from the gun unit to the game apparatus. The game apparatus uses the image data transmitted from the gun unit to specify positions of the markers on the captured image, and based on the specified positions, calculates coordinates of a point of impact for the gun unit. The coordinates of the point of impact are coordinates of an intersection of a line extended in the aiming direction from the barrel of the gun unit and the screen. According to the game apparatus, a player can point at any position (coordinates of a point of impact) on the screen using the input device (gun unit).

The game apparatus also determines whether or not the calculated coordinates of a point of impact are positioned on the screen so as to determine whether or not the input device points an appropriate position, i.e., whether or not the sight of the gun unit is positioned within the screen.

When an input device with which the user can point at any position, such as the gun unit for the game apparatus above, is used, a position (pointing position) pointed using the input device may go outside the screen while the user is not aware of it. When the pointing position goes outside the screen, it is preferable to notify the user that the pointing position is out of the screen, and of a direction in which the pointing position is deviated.

In Patent Document 1, the calculated coordinates of a point of impact are used to determine whether or not the input device points an appropriate position. Therefore, if the image of the marker is not captured, and therefore, the coordinates of a point of impact cannot be calculated, the determination cannot be executed. In other words, when the input device is moved to a position where the image of the light emitting diode cannot be captured, the game apparatus cannot execute the determination, and therefore, cannot notify the user of a direction in which the pointing position is deviated.

Therefore, a feature of certain exemplary embodiments is an information processing apparatus and an information processing program which can notify the user that a position pointed using an input device is deviated from the screen even when the image of a marker is not captured.

Certain exemplary embodiments have the following aspects to attain the feature mentioned above. Note that reference numerals, additional descriptions and the like inside parentheses in this section indicate correspondence to exemplary embodiments described below for the sake of easy understanding, and are not intended to be limiting in any way.

A first aspect of certain exemplary embodiments is directed to a computer readable storage medium (optical disk 4) storing an information processing program (game program 60) executable by a computer (CPU 10, etc.) included in an information processing apparatus (game apparatus 3). The information processing apparatus can communicate with an input device (controller 5) comprising an image capturing means (image capturing device) for capturing an image of a target object (markers 6R and 6L), and calculate a pointing position on a screen of a display device (television 2) based on the image captured by the image capturing means. The input device comprises a motion detecting means (acceleration sensor 37) for detecting a motion of the input device. The information processing program causing the computer to execute a tilt calculating step (S3), a determination step (S4), a comparison step (S8), and a notification step (S9, S10). The tilt calculating step calculates a tilt value (t) indicating a tilt of the input device using a result (acceleration data 62) of detection by the motion detecting means. The determination step determines whether or not the pointing position can be calculated based on the image captured by the image capturing means. The comparison step compares the tilt value calculated by the tilt calculating step with a predetermined reference value (c) when it is determined that the pointing position cannot be calculated. The notification step notifies a user of information about the tilt of the input device, depending on a result of the comparison step.

In a second aspect, the tilt calculating step and the determination step may be repeatedly executed. The information processing program causes the computer to further execute a reference value calculating step (S7). The reference value calculating step calculates the reference value based on one or more tilt values calculated while it is determined that the pointing position can be calculated.

In a third aspect, the information processing program causes the computer to further execute a range calculating step (S6). The range calculating step calculates a tilt range (recognition range) including at least some of the one or more tilt values based on the one or more tilt values calculated while it is determined that the pointing position can be calculated. In the reference value calculating step, the computer calculates the reference value based on the tilt range.

In a fourth aspect, in the reference value calculating step, the computer may calculate an average value between an upper limit value and a lower limit value of the tilt range as the reference value.

In a fifth aspect, in the range calculating step, the computer may change the tilt range so that an upper limit value (maximum value max) and a lower limit value (minimum value min) of the tilt range are brought closer to the tilt value, every time the tilt value is calculated.

In a sixth aspect, the information processing program may cause the computer to further execute a change amount calculating step (S31) of calculating an amount of a change in a position and/or an attitude of the input device. In this case, in the range calculating step, the computer increases a degree by which the upper limit value and the lower limit value of the tilt range are brought closer to the tilt value, with a decrease in the change amount.

In a seventh aspect, in the change amount calculating step, the computer may use, as the change amount of the input device, an amount of a change in the pointing position calculated based on the image captured by the image capturing means.

In an eighth aspect, the information processing program may cause the computer to further execute a storage step. The storage step stores a tilt value calculated during a predetermined period of time from the present to the past, of the one or more tilt values calculated while it is determined that the pointing position can be calculated, into a storage means (main memory 13) of the information processing apparatus. In this case, in the reference value calculating step, the computer calculates the reference value based on a tilt value stored in the storage means when it is determined that the pointing position cannot be calculated.

In a ninth aspect, in the reference value calculating step, the computer may use a most recent tilt value of the one or more tilt values calculated while it is determined that the pointing position can be calculated, as the reference value.

In a tenth aspect, in the reference value calculating step, the computer may set the reference value so as to follow the calculated tilt value, depending on the calculation of the tilt value.

In an eleventh aspect, the tilt value may be represented as any of an angle value ($\theta$) of the input device where a predetermined direction (a direction parallel to the ground; in other words, a direction perpendicular to the gravity direction) is a reference, a value ($t=\sin \theta$) of a sine function of the angle value, and a value of a cosine function of the angle value.

In a twelfth aspect, in the notification step, the computer may notify of a direction in which the input device is deviated from a direction in which the image capturing means can capture the image of the target object.

In a thirteenth aspect, the motion detecting means may be an acceleration sensor (37) for detecting an acceleration applied to the input device. In this case, in the tilt calculating step, the computer calculates or acquires the tilt value using a result of detection by the acceleration sensor.

Certain exemplary embodiments may also be provided in the form of an information processing apparatus having a function similar to that of the information processing apparatus for executing the above-described steps.

According to the first aspect, the computer of the information processing apparatus calculates the tilt of the input device using the detection result of the motion detecting means. When it is determined that the pointing position cannot be calculated, information about the tilt of the input device is output using the calculated tilt value. Thereby, even when the pointing position cannot be calculated, the tilt of the input device can be calculated. Therefore, even in such a case, it is possible to notify the user that the pointing position of the input device is deviated from the screen. Also, based on the calculated tilt, it is possible to notify the user of a direction in which the pointing position is deviated.

According to the second aspect, the reference value is calculated based on the tilt value calculated while it is determined that the pointing position can be calculated. Therefore, the tilt which enables actual calculation of the pointing position is used to execute determination in the determination step, whereby the determination is correct.

According to the third aspect, the tilt range is calculated based on the tilt value calculated while it is determined that the pointing position can be calculated, and the reference value is determined based on the tilt range. Thereby, it is possible to correctly calculate the reference value.

According to the fourth aspect, the average value between the upper limit value and the lower limit value of the tilt range is used as the reference value. Therefore, the reference value can correctly indicate a tilt which enables calculation of the pointing position. Thereby, it is possible to more correctly execute determination in the determination step.

According to the fifth aspect, the tilt range is changed so that the upper limit value and the lower limit value are brought closer to the tilt value, every time the tilt value is calculated. Thereby, for example, even when the tilt range of the input device in which the pointing position can be calculated is changed due to a change in the attitude of the user during an operation using the input device, the tilt range can be appropriately set, depending on the change in the range.

According to the sixth aspect, the degree by which the upper limit value and the lower limit value of the tilt range are brought closer to the tilt value is increased with a decease in the change amount of the input device. Here, when the change amount of the input device is small, the motion of the controller 5 is not rapid, so that the detection result of the motion detecting means relatively correctly indicates the tilt of the input device. Therefore, the tilt value calculated based on the detection result in this case is considered to be correct. In the sixth aspect, when the tilt value is correct, a degree to which the tilt value reflects on the tilt range is increased. When the tilt value is not correct, the degree to which the tilt value reflects on the tilt range is decreased. Thereby, it is possible to more correctly calculate the tilt range.

According to the seventh aspect, the change amount of the pointing position is used as the change amount of the input device, thereby making it possible to correctly calculate the change amount of the input device.

According to the eighth aspect, the reference value is calculated based on a tilt value calculated during a predetermined period of time from the present to the past, of the one or more tilt values calculated while it is determined that the pointing position can be calculated. Thereby, as in the fifth aspect, for example, even when the attitude of the user is changed during an operation using the input device, the reference value can be appropriately set, depending on the change.

According to the ninth aspect, the most recent tilt value of the one or more tilt values calculated while it is determined that the pointing position can be calculated is used as the reference value, thereby making it possible to correctly set the reference value.

According to the tenth aspect, the reference value is set so as to follow the calculated tilt value. Therefore, as in the fifth and eighth aspects, even when the attitude of the user is changed during an operation using the input device, the reference value can be appropriately set, depending on the change.

According to the eleventh aspect, the tilt value is represented as an angle value of the input device where a predetermined direction is a reference, a value of a sine function of the angle value, or a value of a cosine function of the angle value. Thereby, the tilt of the input device can be represented in a simple form. Therefore, for example, as compared to when the tilt is represented by a vector, the computation process of the tilt value can be facilitated.

According to the twelfth aspect, information about a direction in which the input device is deviated from a direction in which the image capturing means can capture the image of the target object, is presented to the user. Thereby, the user can easily know a direction in which the input device is turned.

According to the thirteenth aspect, an acceleration sensor is used as the motion detecting means, thereby it is possible to easily calculate the tilt of the input device.

These and other features, aspects and advantages of certain exemplary embodiments will become more apparent from the following detailed description when taken in conjunction with the accompanying drawings.

DETAILED DESCRIPTION

Whole Configuration of Game System

Figure 1:
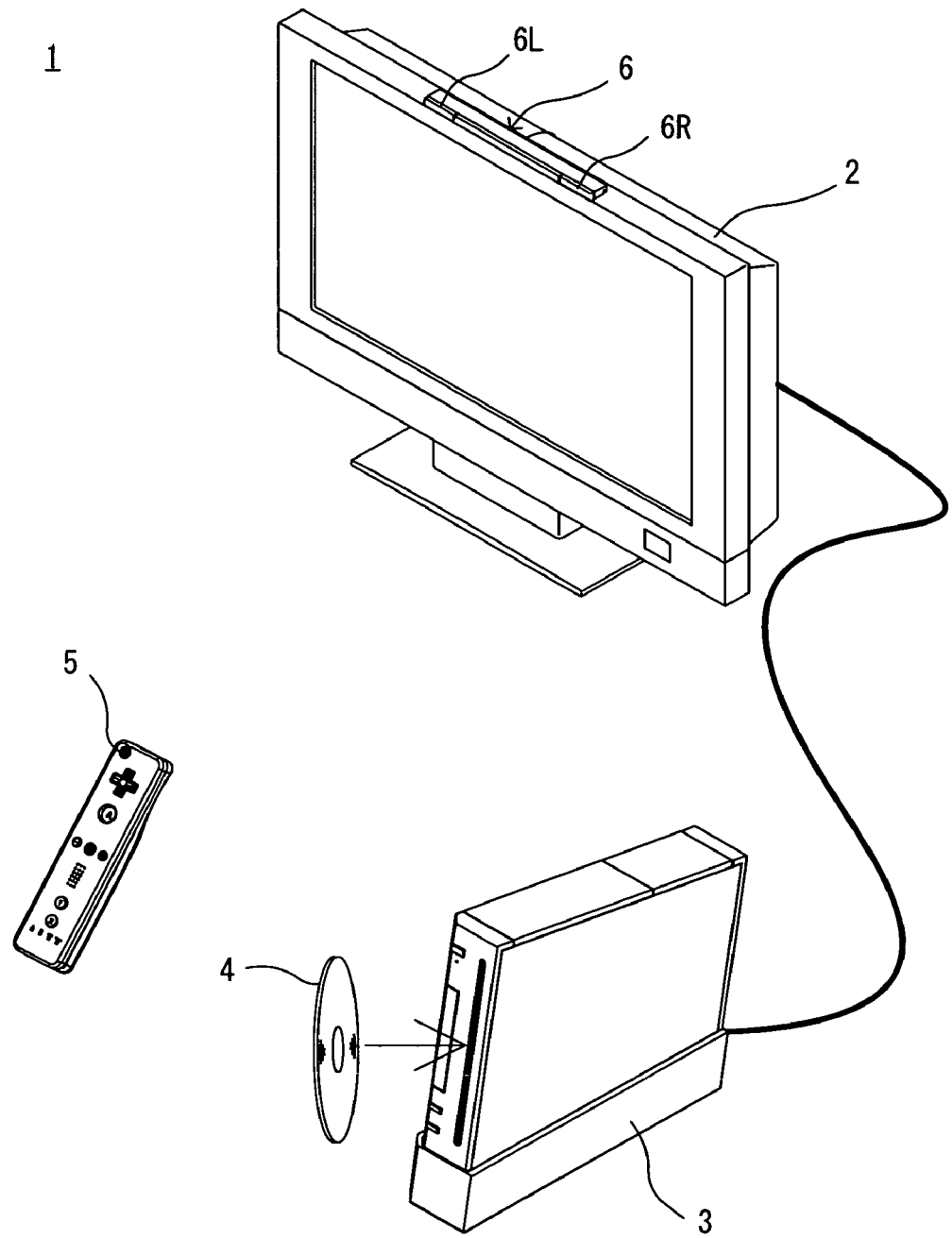
FIG. 1 is an external view of a game system 1.

A game system 1 including a game apparatus according to an exemplary embodiment of the present invention will be described with reference to FIG. 1. FIG. 1 is an external view of the game system 1. Hereinafter, the game apparatus and a game program of the exemplary embodiment will be described, where the game apparatus is a stationary game apparatus as an example. In FIG. 1, the game system 1 includes a television set (hereinafter simply referred to as a "television") 2, a game apparatus 3, an optical disc 4, a controller 5, and a sensor bar 6. In the game system 1, the game apparatus 3 executes a game process based on a game operation using the controller 5.

The optical disc 4 which is an exemplary information storing medium changeable with respect to the game apparatus 3 is detachably loaded into the game apparatus 3. On a front surface of the game apparatus 3, a slot through which the optical disc 4 is loaded or unloaded is provided. The game apparatus 3 executes a game process by reading and executing a game program stored on the optical disc 4 which has been loaded through the slot.

The television 2 is connected via a connection cord to the game apparatus 3. The television 2 is a display device, such as a television set for home use or the like. The television 2 displays a game image which is obtained as a result of the game process executed in the game apparatus 3. The sensor bar 6 is provided in the vicinity of the screen of the television 2 (on an upper side of the screen in FIG. 1). The sensor bar 6 comprises two markers 6R and 6L at both ends thereof. Specifically, the markers 6R and 6L are one or more infrared LEDs which output infrared light toward the front of the television 2. The sensor bar 6 is connected to the game apparatus 3, so that the game apparatus 3 can control ON/OFF of each infrared LED included in the sensor bar 6.

The controller 5 is an input device which inputs operation data indicating an operation performed with respect to the controller 5, to the game apparatus 3. The controller 5 and the game apparatus 3 are connected via wireless communication. In this exemplary embodiment, for example, the Bluetooth (R) technology is used for wireless communication between the controller 5 and the game apparatus 3. Note that, in another exemplary embodiment, the controller 5 and the game apparatus 3 may be connected via wired communication.

Internal Configuration of Game Apparatus 3

Next, a configuration of the game apparatus 3 will be described with reference to FIG. 2. Note that FIG. 2 is a functional block diagram of the game apparatus 3.

Figure 2:
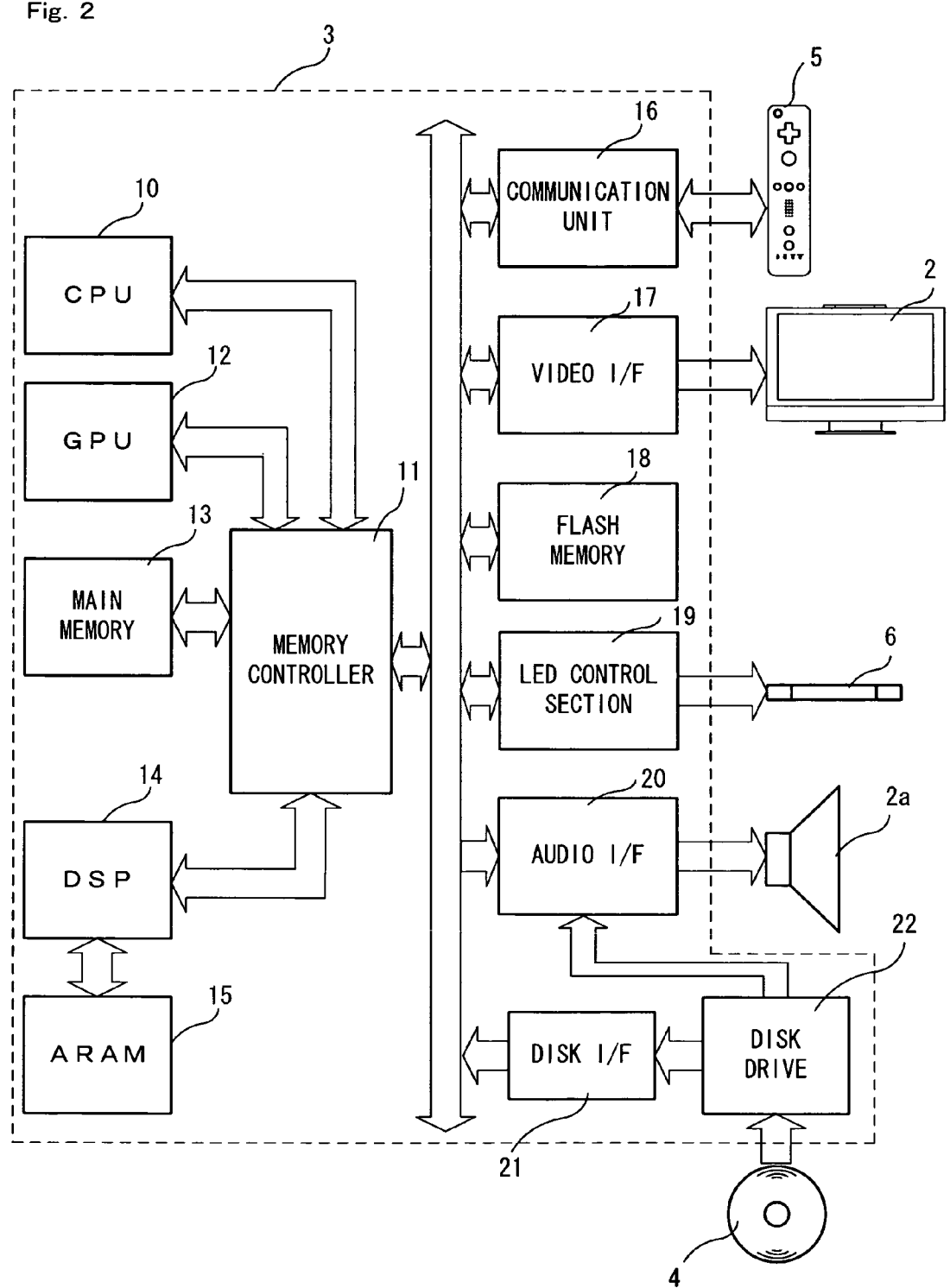
FIG. 2 is a functional block diagram of a game apparatus 3.

In FIG. 2, the game apparatus 3 comprises a CPU (Central Processing Unit) 10, which executes various programs. The CPU 10 executes a boot program stored in a boot ROM (not shown), executes, for example, initialization of memories, such as a main memory 13 and the like, before executing a game program stored on the optical disc 4, and executes a game process or the like corresponding to the game program. A GPU (Graphics Processing Unit) 12, the main memory 13, a DSP (Digital Signal Processor) 14, an ARAM (Audio RAM) 15, and the like are connected via a memory controller 11 to the CPU 10. A communication unit 16, a video I/F (interface) 17, a flash memory 18, an LED control section 19, an audio I/F 20, and a disk I/F 21 are connected via a predetermined bus to the memory controller 11. The video I/F 17 is connected to the television 2. The LED control section 19 is connected to the sensor bar 6. The audio I/F 20 is connected to a loudspeaker 2a and a disk drive 22 of the television 2. The disk I/F 21 is connected to the disk drive 22.

The GPU 12, which executes image processing based on a command from the CPU 10, comprises a semiconductor chip which executes a calculation process required for 3D graphics display, for example. The GPU 12 executes image processing using a memory specialized for image processing (not shown) or a memory area which is a portion of the main memory 13. The GPU 12 generates game image data or movie video to be displayed on the television 2 by the image processing, and outputs the data via the memory controller 11 and the video I/F 17 to the television 2 as required.

The main memory 13 is a memory area which is used by the CPU 10, and stores a game program or the like required for a process by the CPU 10, as required. For example, the main memory 13 stores a game program, various data, or the like read from the optical disc 4 by the CPU 10. The game program stored in the main memory 13 is executed by the CPU 10.

The DSP 14 processes sound data or the like which is generated by the CPU 10 when a game program is executed. The ARAM 15 for storing the sound data or the like is connected to the DSP 14. The ARAM 15 is used when the DSP 14 executes a predetermined process (e.g., storage of a read-ahead game program or sound data). The DSP 14 reads sound data stored in the ARAM 15, and outputs the data via the memory controller 11 and the audio I/F 20 to the loudspeaker 2a.

The memory controller 11 executes a centralized control of data transfer. The communication unit 16, the flash memory 18, the LED control section 19, and the various I/Fs 17, 20 and 21 are connected to the memory controller 11.

The communication unit 16 transmits and receives data between the game apparatus 3 and the controller 5. The controller 5 transmits operation data indicating an operation performed with respect to the controller 5, to the game apparatus 3. The communication unit 16 receives operation data from the controller 5, and outputs the received operation data via the memory controller 11 to the CPU 10. The CPU 10 executes a game process in accordance with the operation data. Control data for controlling an operation of the controller 5 is transmitted to the controller 5 as follows: the control data is output to the communication unit 16, which in turn transmits the input control data to the controller 5.

The television 2 is connected to the video I/F 17. Image data generated by the GPU 12 is output via the video I/F 17 to the television 2. The flash memory 18 functions as a backup memory for fixedly storing data, such as saved data or the like. The game apparatus 3 can reproduce a game state which was executed in the past, using the saved data stored in the flash memory 18, and display a game image on the television 2. The infrared LED included in the sensor bar 6 is connected to the LED control section 19. To turn ON the infrared LED, the CPU 10 instructs the LED control section 19 to supply a voltage to the infrared LED. The LED control section 19 supplies a voltage to the infrared LED in accordance with the voltage supply instruction, so that the infrared LED is turned ON. In this exemplary embodiment, the infrared LED is ON during at least a period of time when a game program is being executed. The loudspeaker 2a of the television 2 is connected to the audio I/F 20. Data read from the ARAM 15 by the DSP 14 or sound data directly output from the disk drive 22 is output from the loudspeaker 2a. The disk drive 22 is connected to the disk I/F 21. The disk drive 22 reads data stored on the optical disc 4 disposed at a predetermined read position, and outputs the read data to the disk I/F 21 or the audio I/F 20.

The game apparatus 3 also comprises a network communication section (not shown) via which the game apparatus 3 is connected to a network, such as the Internet or the like. The game apparatus 3 can acquire a game program or various data from the outside or transmit data to the outside, via the network communication section.

Configuration of Controller 5

Figure 3:
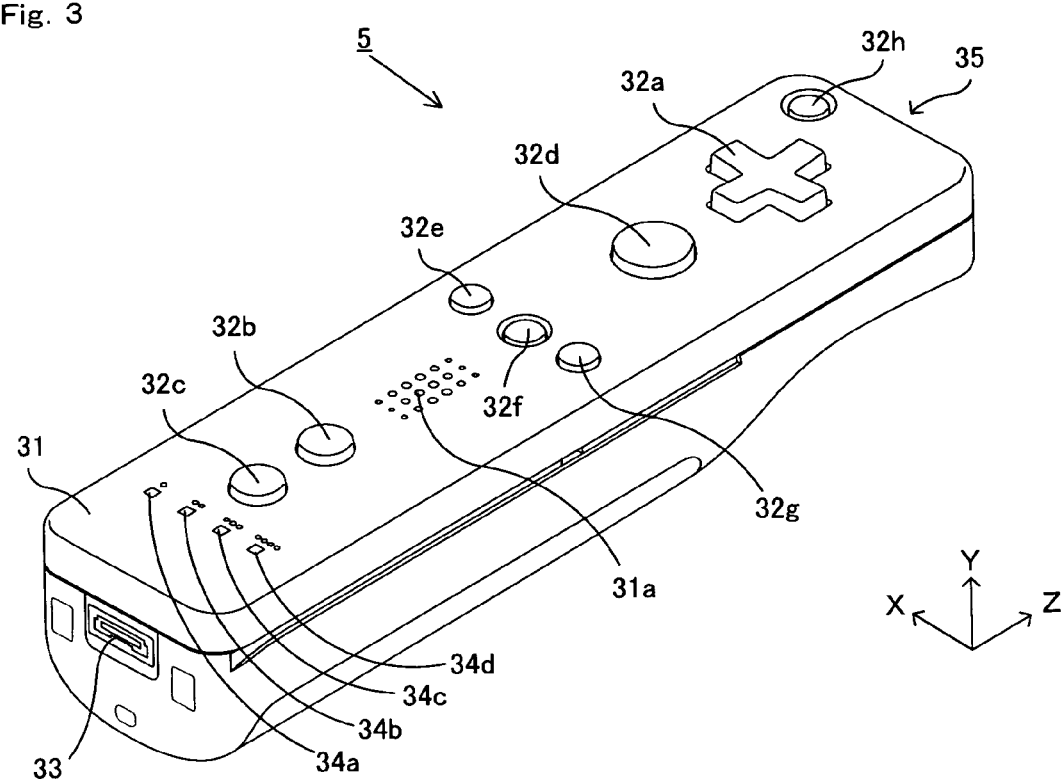
FIG. 3 is a perspective view of an external appearance of a structure of a controller 5.
Figure 4:
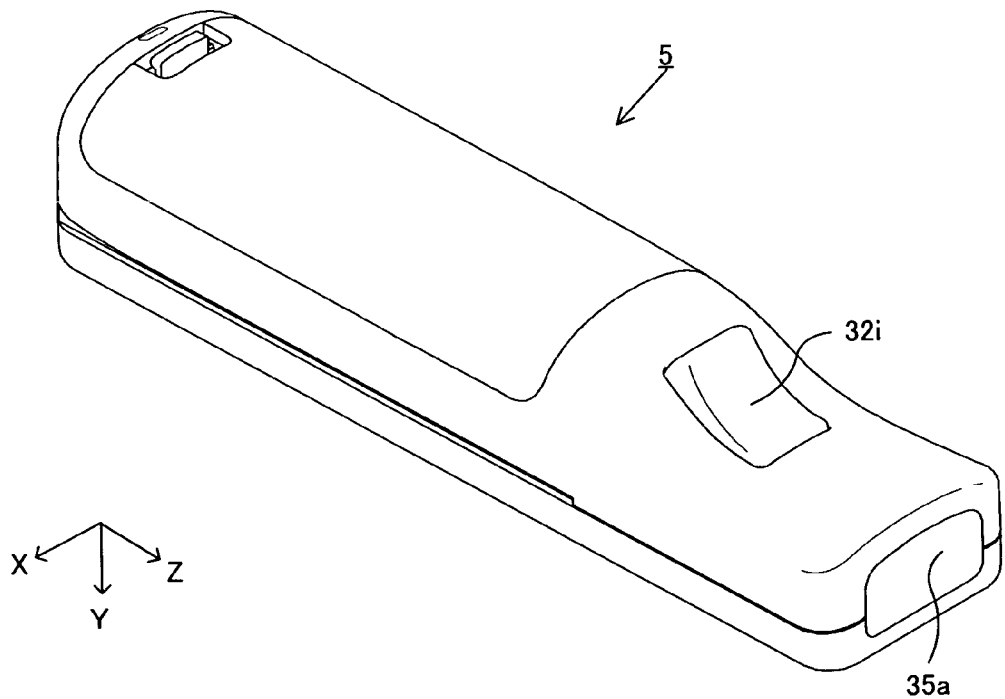
FIG. 4 is a perspective view of an external appearance of the structure of the controller 5.

Next, the controller 5 will be described with reference to FIGS. 3 to 6. FIGS. 3 and 4 are perspective views illustrating an external appearance of the controller 5. FIG. 3 is a perspective view of the controller 5 as viewed from the top and the rear. FIG. 4 is a perspective view of the controller 5 as viewed from the bottom and the front.

In FIGS. 3 and 4, the controller 5 has a housing 31 which is formed by, for example, plastic molding. The housing 31 is in the shape of substantially a rectangular parallelepiped where a front-to-rear direction (the Z-axis direction in FIG. 3) is a longitudinal direction. The whole housing 31 has a size which enables an adult and a child to hold the controller 5 with one hand. A player performs a game operation by using the controller 5, i.e., specifically, pressing down a button provided on the controller 5, and moving the controller 5 itself to change a position or an attitude of the controller 5.

The housing 31 is provided with a plurality of operation buttons. As illustrated in FIG. 3, a cross key 32a, a first button 32b, a second button 32c, an A button 32d, a minus button 32e, a home button 32f, a plus button 32g, and a power button 32h are provided on an upper surface of the housing 31. On the other hand, as illustrated in FIG. 4, a hollow portion is formed on a lower surface of the housing 31. A B button 32i is provided on a rear slope surface of the hollow portion. These operation buttons 32a to 32i are assigned respective functions depending on a game program executed by the game apparatus 3 as required. The power button 32h is used to remotely power ON/OFF the main body of the game apparatus 3. Upper surfaces of the home button 32f and the power button 32h are buried below the upper surface of the housing 31. Thereby, the player is prevented from unintentionally and erroneously pressing down the home button 32f and the power button 32h.

A connector 33 is provided on a rear surface of the housing 31. The connector 33 is used to connect the controller 5 with other devices (e.g., another controller).

A plurality of LEDs 34a to 34d (four LEDs in FIG. 3) are provided at a rear portion of the upper surface of the housing 31. Here, the controller 5 is assigned controller identification (number) so as to distinguish it from other controllers. The LEDs 34a to 34d are used so as to notify the player of controller identification currently set for the controller 5, the state of charge of a battery in the controller 5, or the like. Specifically, when a game operation is performed using the controller 5, any one of the LEDs 34a to 34d is turned ON, depending on the controller identification.

Figure 5A:
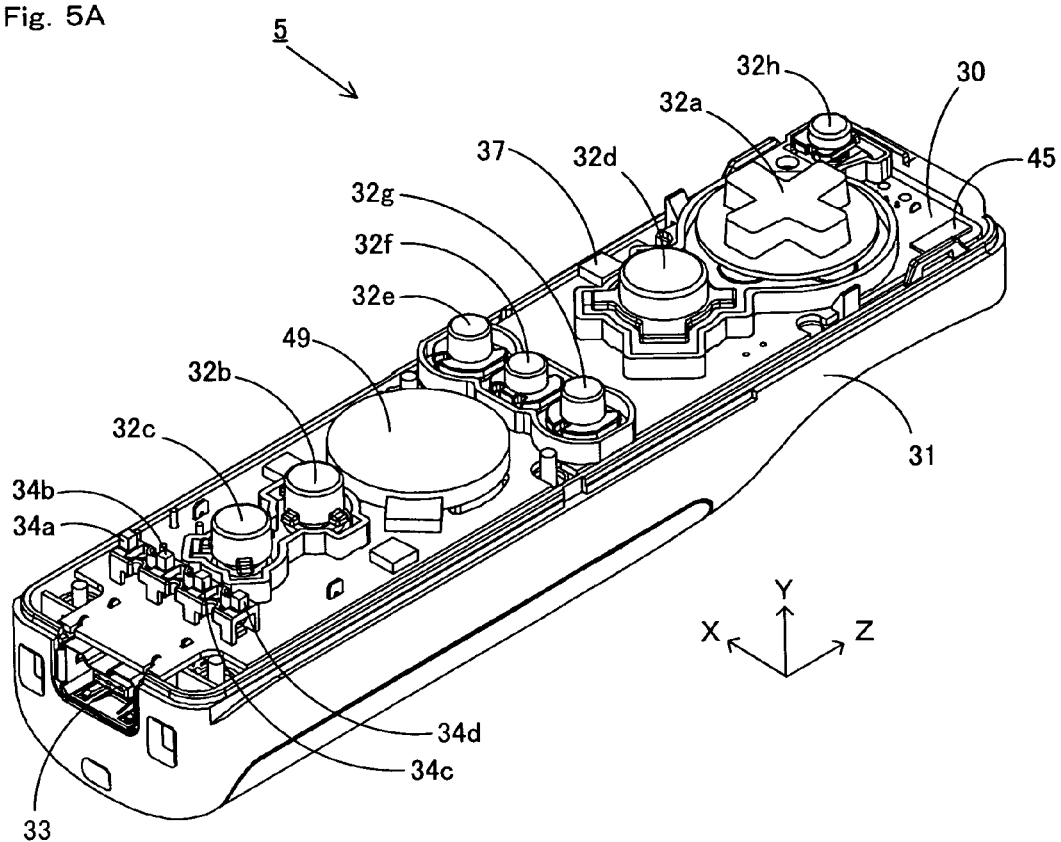
FIG. 5A is a diagram illustrating an internal structure of the controller 5.
Figure 5B:
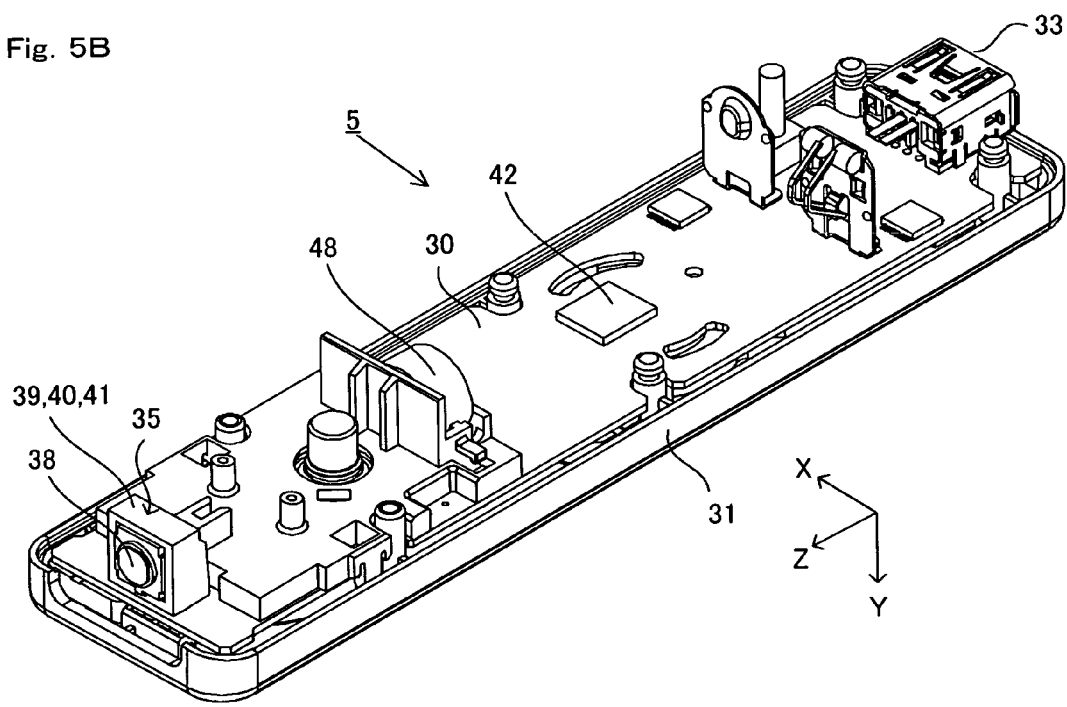
FIG. 5B is a diagram illustrating an internal structure of the controller 5.

The controller 5 has an image capture information computing section 35 (FIG. 5B). As illustrated in FIG. 4, a light incident surface 35a for the image capture information computing section 35 is provided on a front surface of the housing 31. The light incident surface 35a is made of a material which can transmit at least infrared light from the markers 6R and 6L.

Also, sound holes 31a through which sound is emitted from a loudspeaker 49 (FIG. 5A) included in the controller 5 to the outside, are formed between the first button 32b and the home button 32f on the upper surface of the housing 31.

Next, an internal structure of the controller 5 will be described with reference to FIGS. 5A and 5B. FIGS. 5A and 5B are diagrams illustrating the internal structure of the controller 5. Note that FIG. 5A is a perspective view of the controller 5 where an upper housing (a portion of the housing 31) is cut away. FIG. 5B is a perspective view of the controller 5 where a lower housing (a portion of the housing 31) is cut away. FIG. 5B illustrates a perspective view of a base board 30 of FIG. 5A as viewed from a bottom surface thereof.

In FIG. 5A, the base board 30 is fixed inside the housing 31. On an upper major surface of the base board 30, the operation buttons 32a to 32h, the LEDs 34a to 34d, an acceleration sensor 37, an antenna 45, the loudspeaker 49, and the like are provided. These are connected to a microcomputer 42 (see FIG. 5B) via conductors (not shown) formed on the base board 30 and the like. In this exemplary embodiment, the acceleration sensor 37 is positioned away from a center of the controller 5 in the X-axis direction, thereby facilitating calculation of a motion of the controller 5 when the controller 5 is rotated around the Z axis. A radio module 44 (FIG. 6) and the antenna 45 enable the controller 5 to function as a wireless controller.

On the other hand, in FIG. 5B, the image capture information computing section 35 is provided at a front edge on a lower major surface of the base board 30. The image capture information computing section 35 comprises an infrared filter 38, a lens 39, an image capturing device 40, and an image processing circuit 41, which are arranged in this order from the front of the controller 5. These members 38 to 41 are attached on the lower major surface of the base board 30.

The microcomputer 42 and a vibrator 48 are provided on the lower major surface of the base board 30. The vibrator 48 may be, for example, a vibration motor or a solenoid. The vibrator 48 is connected to the microcomputer 42 via a conductor formed on the base board 30 and the like. The activation of the vibrator 48, which is instructed by the microcomputer 42, generates vibration in the controller 5. Thereby, the vibration is transferred to a player's hand holding the controller 5, thereby making it possible to achieve a so-called vibration-feature supporting game. In this exemplary embodiment, the vibrator 48 is disposed somehow closer to the front of the housing 31, i.e., the vibrator 48 is placed closer to the end of the controller 5 than the center of the controller 5 is. Therefore, the vibration of the vibrator 48 significantly vibrates the whole controller 5. The connector 33 is attached to a rear edge on the major lower surface of the base board 30. Note that, in addition to the parts of FIGS. 5A and 5B, the controller 5 comprises a quartz oscillator for generating a basic clock for the microcomputer 42, an amplifier for outputting an audio signal to the loudspeaker 49, and the like.

Note that the shape of the controller 5, the shape of each operation button, the numbers and arrangements of acceleration sensors and vibrators, and the like of FIGS. 3 to 5A and 5B and the like are only for illustrative purposes. The exemplary embodiments described herein can be implemented using other shapes, numbers and arrangements. The image capture information computing section 35 (the light incident surface 35a of the image capture information computing section 35) in the controller 5 may not be positioned on the front surface of the housing 31, and may be provided on other surfaces as long as it can capture light from the outside of the housing 31.

Figure 6:
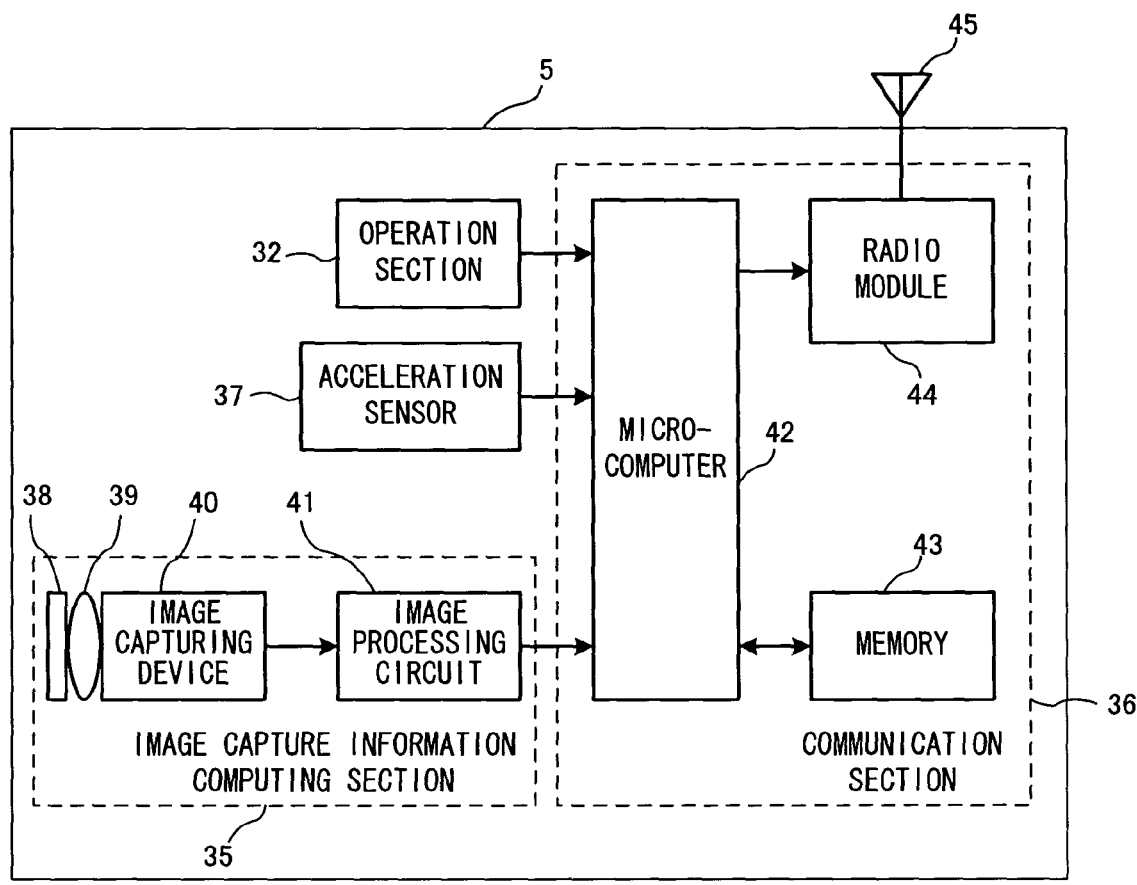
FIG. 6 is a block diagram illustrating a configuration of the controller 5.

FIG. 6 is a block diagram illustrating a configuration of the controller 5. The controller 5 comprises an operation section 32 (operation buttons 32a to 32i), the connector 33, the image capture information computing section 35, a communication section 36, and the acceleration sensor 37. The controller 5 transmits data depending on an attitude of the controller 5, as operation data, to the game apparatus 3.

The operation section 32 includes the operation buttons 32a to 32i, and outputs data indicating an input state of each of the operation buttons 32a to 32i (whether or not each of the operation buttons 32a to 32i has been pressed down) to the microcomputer 42 of the communication section 36.

The acceleration sensor 37 detects an acceleration (including a gravity acceleration) of the controller 5, i.e., detects a force (including gravity) applied to the controller 5. Of accelerations applied to a detection portion of the acceleration sensor 37, the acceleration sensor 37 detects a value of an acceleration (linear acceleration) in a linear direction along a sensing-axis direction. For example, in the case of a multi-axis acceleration sensor having two or more axes, an acceleration component along each axis is detected as an acceleration applied to the detection portion of the acceleration sensor. For example, a three- or two-axis acceleration sensor may be available from Analog Devices, Inc. or STMicroelectronics N.V.

In this exemplary embodiment, the acceleration sensor 37 detects a linear acceleration along each of three axes extending in a vertical direction (Y-axis direction in FIG. 3), a lateral direction (X-axis direction in FIG. 3), and a front-to-rear direction (Z-axis direction in FIG. 3), where the controller 5 is used as a reference. Since the acceleration sensor 37 detects an acceleration with respect to a linear direction along each axis, an output of the acceleration sensor 37 indicates a value of a linear acceleration along each axis. In other words, the detected acceleration is represented as a three-dimensional vector in an XYZ coordinate system provided where the controller 5 is a reference. Hereinafter, a vector having acceleration values with respect to a plurality of axes which are detected by the acceleration sensor 37, is referred to as an acceleration vector.

The data (acceleration data) indicating the acceleration (acceleration vector) detected by the acceleration sensor 37 is output to the communication section 36. In this exemplary embodiment, the acceleration sensor 37 is used as a sensor for outputting data for calculating a tilt of the controller 5. In other words, the game apparatus 3 calculates the tilt of the controller 5 from the acceleration data. Note that a method for calculating the tilt of the controller 5 will be described below.

Note that, in this exemplary embodiment, in order to calculate the tilt of the controller 5, an acceleration sensor of a capacitance type is used. In another exemplary embodiment, any sensor capable of detecting a motion of the controller 5, and based on the result of the detection, calculating the tilt of the controller 5, may be used. For example, acceleration sensors of other types or a gyro-sensor may be used instead of the capacitance-type acceleration sensor. Whereas the acceleration sensor detects a linear-direction acceleration along each axis, the gyro-sensor detects an angular velocity caused by rotation. Specifically, the gyro-sensor may be employed instead of the acceleration sensor, however, properties of detected signals are different from each other, so that these sensors cannot be easily interchanged. Therefore, when the gyro-sensor is used instead of the acceleration sensor to calculate the tilt, a significant change is required. Specifically, the value of a tilt is initialized during the start of detection. Thereafter, angular acceleration data output from the gyro-sensor is integrated. Next, the amount of a change from the initialized tilt value is calculated. The tilt of the controller 5 can be calculated from the initialized tilt and the calculated change amount. In this case, the calculated tilt is represented by an angle.

Note that, as has been described above, when the acceleration sensor is used to calculate the tilt, the tilt is calculated based on an acceleration vector. Therefore, the calculated tilt can be represented by a vector. Thus, the use of the acceleration sensor is different from the use of the gyro-sensor in that an absolute direction can be detected without initialization. Also, the gyro-sensor and the acceleration sensor have different properties of values calculated as the tilt (i.e., an angle and a vector). Therefore, when the acceleration sensor is replaced with the gyro-sensor, predetermined conversion is required, taking the properties of values into consideration.

The image capture information computing section 35 is a system for analyzing image data captured by an image capturing means to determine a region having a high luminance in the image data and detect a center-of-gravity position, a size or the like of the region. The image capture information computing section 35 has, for example, a maximum sampling cycle of about 200 frames/sec, and therefore, can track and analyze a relatively high-speed motion of the controller 5.

The image capture information computing section 35 includes the infrared filter 38, the lens 39, the image capturing device 40, and the image processing circuit 41. The infrared filter 38 passes only infrared light entering from the front of the controller 5. The lens 39 collects infrared light passing through the infrared filter 38 and causes the light to enter the image capturing device 40. The image capturing device 40 may be, for example, a solid-state image capturing device, such as a CMOS sensor or a CCD sensor, receives infrared light collected by the lens 39, and outputs an image signal. Here, the markers 6R and 6L of the sensor bar 6 provided in the vicinity of the display screen of the television 2 are each made of an infrared LED which outputs infrared light toward the front of the television 2. Therefore, by providing the infrared filter 38, the image capturing device 40 captures only infrared light passing through the infrared filter 38 to generate image data. Thereby, images of the markers 6R and 6L can be more correctly captured. Hereinafter, the image captured by the image capturing device 40 is referred to as a captured image. The image data generated by the image capturing device 40 is processed by the image processing circuit 41. Specifically, the image processing circuit 41 calculates a position of a target object (the markers 6R and 6L) in the captured image. The image processing circuit 42 outputs coordinates indicating the calculated position to the microcomputer 42 of the communication section 36. The coordinate data is transmitted as operation data by the microcomputer 42 to the game apparatus 3. Hereinafter, the coordinates are referred to as "marker coordinates". The marker coordinates vary, depending on an orientation (attitude) or a position of the controller 5 itself. Therefore, the game apparatus 3 can use the marker coordinates to calculate the orientation or position of the controller 5. Note that, in another exemplary embodiment, the controller 5 may transmit data required for calculation of the marker coordinates (e.g., data of a captured image) to the game apparatus 3, and based on the data, the game apparatus 3 may calculate the marker coordinates.

The communication section 36 includes the microcomputer 42, a memory 43, the radio module 44, and the antenna 45. The microcomputer 42 controls the radio module 44 which wirelessly transmits data obtained by the microcomputer 42 to the game apparatus 3, while using the memory 43 as a memory area during a process.

Data output from the operation section 32, the image capture information computing section 35, and the acceleration sensor 37 to the microcomputer 42 is temporarily stored in the memory 43. The data is transmitted as the operation data to the game apparatus 3. Specifically, when the timing of transmission to the reception unit 16 arrives, the microcomputer 42 outputs the operation data stored in the memory 43 to the radio module 44. The radio module 44 uses, for example, the Bluetooth® technique to modulate carrier waves having a predetermined frequency with the operation data, and emits a resultant weak radio wave signal from the antenna 45. In other words, the operation data is modulated by the radio module 44 into the weak radio wave signal, which is in turn transmitted from the controller 5. The weak radio wave signal is received by the reception unit 16 of the game apparatus 3. By demodulation or decoding of the received weak radio wave signal, the game apparatus 3 can obtain the operation data. The CPU 10 of the game apparatus 3 performs a game process based on the obtained operation data and a game program. Note that wireless transmission from the communication section 36 to the reception unit 16 is sequentially executed in predetermined cycles. Since a game process is generally executed in units of 1/60 sec (one frame time), transmission is preferably performed in cycles which are shorter than 1/60 sec. For example, the communication section 36 of the controller 5 outputs the operation data to the communication unit 16 of the game apparatus 3 at a rate of one per 1/200 sec.

The player can perform an operation of pointing any position on the screen using the controller 5 in addition to a conventional general game operation of pressing down each operation button.

Outlines of Game Operation and Game Process

Figure 7:
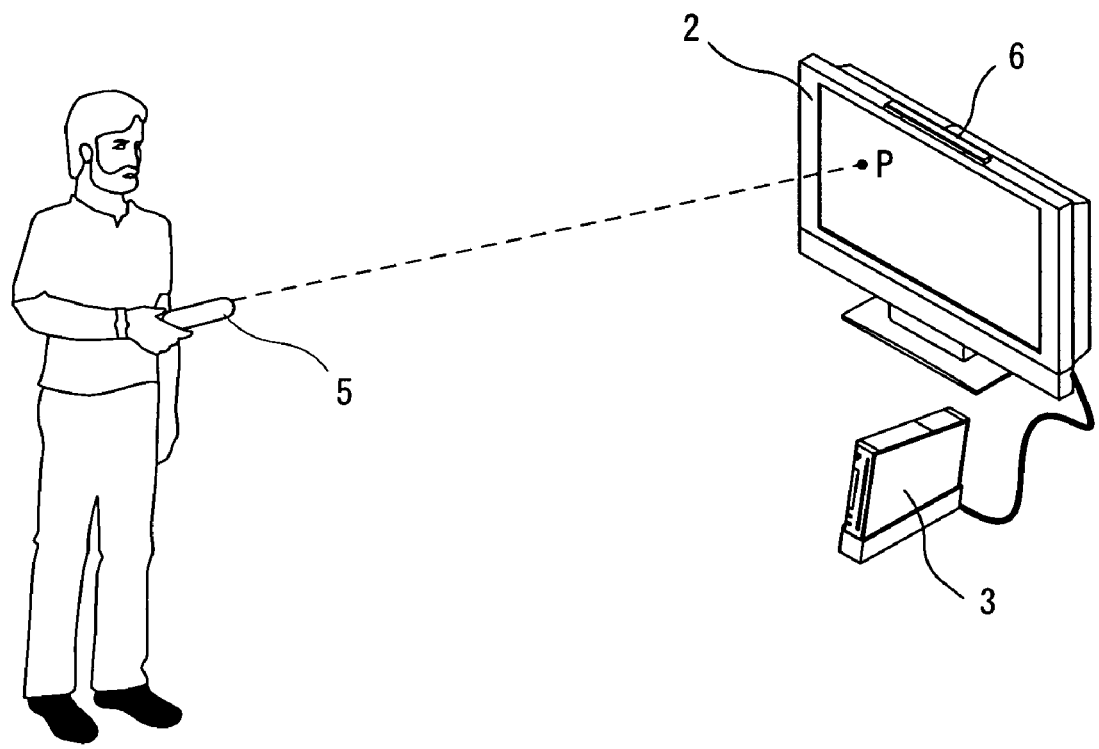
FIG. 7 is a diagram illustrating a situation where the controller 5 is used to perform a game operation.

An exemplary game operation will be described with reference to FIG. 7. FIG. 7 is a diagram illustrating a situation where the controller 5 is used to perform a game operation. In this exemplary embodiment, as illustrated in FIG. 7, the player performs a game operation of pointing at a position P on the screen of the television 2 using the controller 5. Here, the position P is a position on the screen which is pointed by the controller 5, and is ideally a position which is an intersection of a straight line extended in the longitudinal direction from the front end portion of the controller 5 and the screen of the television 2. Note that the position P does not need to be exactly such an ideal position, and a position in the vicinity of such an ideal position may be calculated by the game apparatus 3. Hereinafter, a position on the screen pointed by the controller 5 is referred to as a "pointing position". The player performs a game operation by moving the pointing position on the screen.

The game apparatus 3 calculates the pointing position P on the screen based on data of marker coordinates included in operation data transmitted from the controller 5. Thereafter, the game apparatus 3 executes a game using the pointing position P as a designated input. The game is, for example, a shooting game in which the pointing position P is used as a sight position, or alternatively, a game in which an object (e.g., a cursor) is displayed on the pointing position P, and the object is moved, depending on the movement of the pointing position P. Thus, the player can move the sight of a gun or an object displayed on the screen by performing an operation of moving the controller 5.

Figure 8:
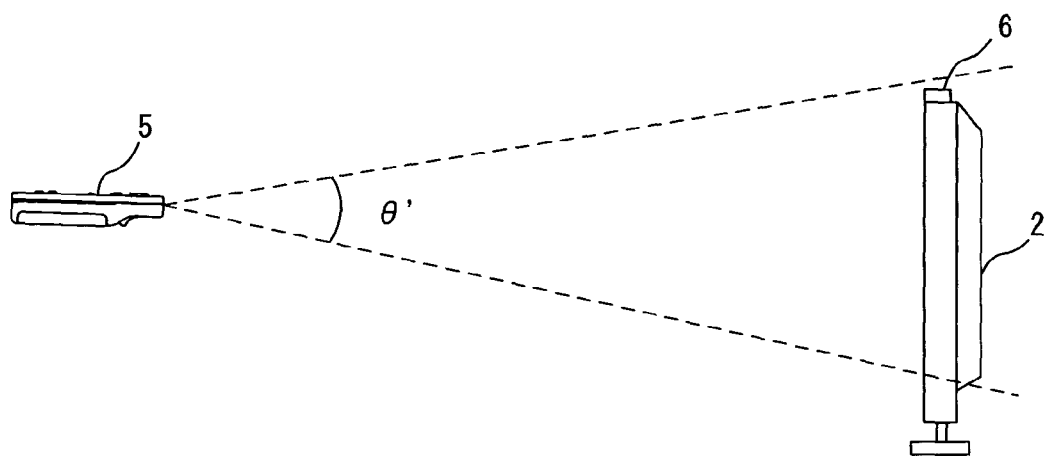
FIG. 8 is a diagram illustrating a relationship between the controller 5 and a sensor bar 6 when images of markers are captured.

FIG. 8 is a diagram illustrating a relationship between the controller 5 and the sensor bar 6 when images of the markers 6R and 6L are captured. As illustrated in FIG. 8, the image capturing device 40 of the controller 5 receives incident light within the range of a visual field angle θ' around an image capturing direction of the controller 5. For example, the visual field angle (half-value angle) θ' of the image capturing device 40 is 41°. When the controller 5 is oriented so that the image capturing device 40 can capture the images of the markers 6R and 6L of the sensor bar 6 as illustrated in FIG. 8, the image capturing device 40 can detect (capture the images of) the markers 6R and 6L, and the game apparatus 3 can calculate the marker coordinates.

Figure 9:
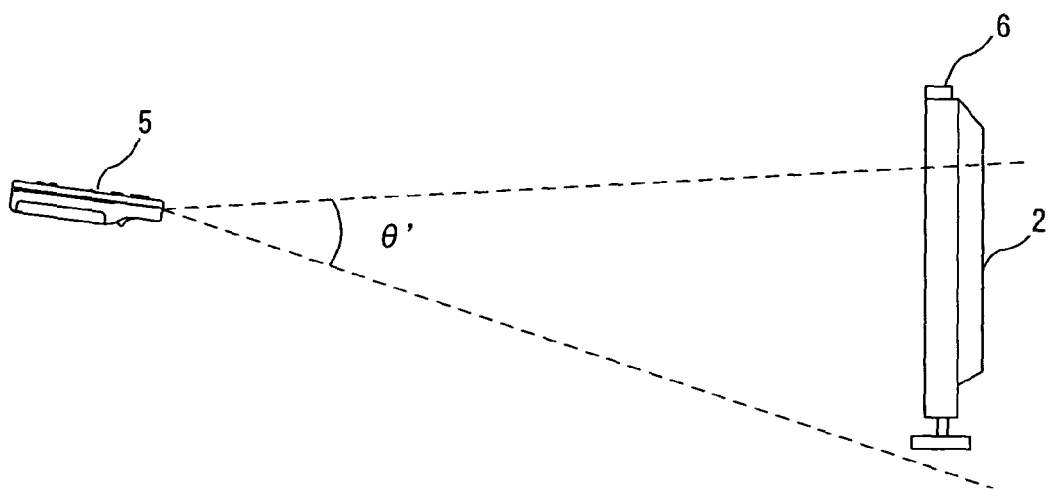
FIG. 9 is a diagram illustrating a relationship between the controller 5 and the sensor bar 6 when the images of the markers are not captured.

On the other hand, FIG. 9 is a diagram illustrating a relationship between the controller 5 and the sensor bar 6 when the images of the markers 6R and 6L are not captured. As illustrated in FIG. 9, when the controller 5 is not oriented in a direction which enables the image capturing device 40 to capture the images of the markers 6R and 6L of the sensor bar 6, the image capturing device 40 cannot detect (capture the images of) the markers 6R and 6L, so that the markers are not included in the captured image, and therefore, the game apparatus 3 cannot calculate the marker coordinates. Therefore, during a game, when the image capturing device 40 cannot detect the markers 6R and 6L as illustrated in FIG. 9, it is likely that the player cannot perform a game operation, or cannot perform a correct game operation.

Therefore, in this exemplary embodiment, when the image capturing device 40 cannot detect the markers 6R and 6L, the game apparatus 3 calculates a current orientation (tilt) of the controller 5. Note that the game apparatus 3 of this exemplary embodiment calculates the tilt of the controller 5 in relation to a vertical direction (i.e., a direction parallel to a gravity direction) where the player is a reference. The tilt of the controller 5 is calculated based on an acceleration detected by the acceleration sensor 37 of the controller 5. Based on the calculated tilt, the game apparatus 3 notifies the player of a direction in which the player should turn the controller 5. For example, when the controller 5 is oriented excessively downward as illustrated in FIG. 9, the player is notified that the player should turn the controller 5 upward. By such notification, even when the player operates and orients the controller 5 in a wrong direction, the player can be notified of a correct orientation (an orientation in which the markers 6R and 6L can be detected), thereby making it possible to prevent a game operation from being not performed. Thereby, it is possible to improve the operability of a game operation using the controller 5.

Note that, since the player generally holds the controller 5 at a height different from the height of the eyes, it is difficult for the player to recognize that the controller 5 is deviated from a correct orientation in relation to the vertical direction where the player is a reference. On the other hand, it is considered to be relatively easy for the player to recognize that the controller 5 is deviated from a correct orientation in relation to the lateral direction where the player is a reference. Therefore, in this exemplary embodiment, the game apparatus 3 notifies the player of only an orientation of the controller 5 in relation to the vertical direction where the player is a reference, but not an orientation of the controller 5 in relation to the lateral direction where the player is a reference.

Note that the tilt of the controller 5 immediately after the markers 6R and 6L are no longer detected, can be estimated based on the marker coordinates immediately before the markers 6R and 6L are no longer detected. For example, when the marker coordinates are positioned in the vicinity of an upper end of the captured image immediately before the markers 6R and 6L are no longer detected, the controller 5 was oriented downward. Therefore, when the markers 6R and 6L are no longer detected immediately after the marker coordinates are positioned in the vicinity of the upper end of the captured image, it can be estimated that since the controller 5 are oriented excessively downward, the markers 6R and 6L are no longer detected. However, in the method for estimating the tilt of the controller 5 using the marker coordinates, it is only possible to estimate the tilt of the controller 5 immediately after the markers 6R and 6L are no longer detected. When the orientation of the controller 5 is subsequently changed, the change cannot be detected. For example, when the controller 5 is oriented excessively upward after the markers 6R and 6L are no longer detected since the controller 5 is oriented excessively downward, the game apparatus 3 cannot recognize the current state of the controller 5. Also, in the method above, the current state is only estimated based on past information, and therefore, the tilt of the controller 5 cannot be correctly calculated.

In contrast to this, according to this exemplary embodiment, the acceleration sensor 37 is used to calculate the tilt of the controller 5. Therefore, after the markers 6R and 6L are no longer detected, the current orientation of the controller 5 can be correctly calculated no matter in what direction the controller 5 is oriented. Thereby, it is possible to notify the player of a direction in which the controller 5 should be turned in relation to the current state.

Detail of Game Process

Figure 10:
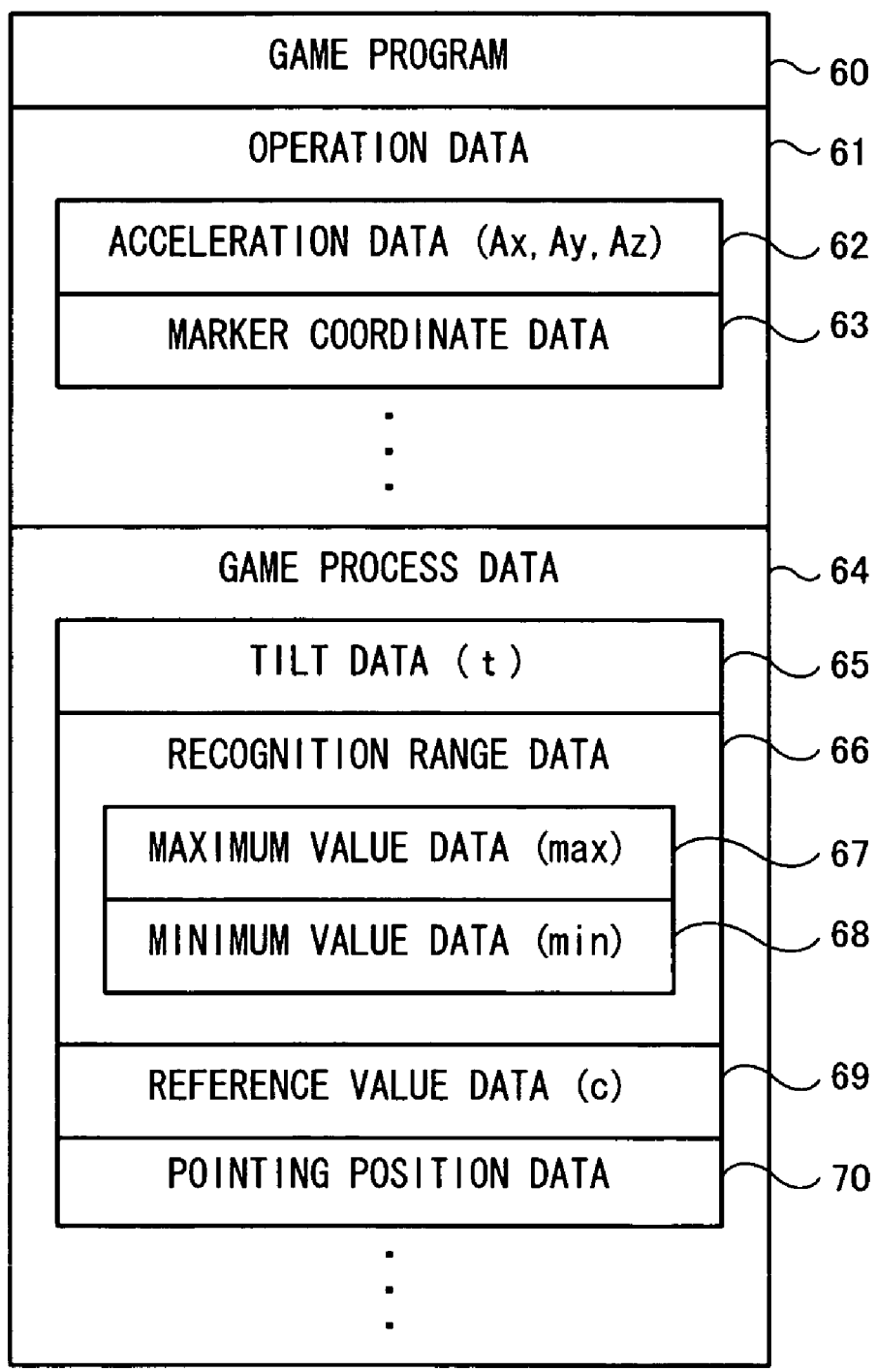
FIG. 10 is a diagram illustrating main data stored in a main memory 13 of the game apparatus 3.

Hereinafter, a detail of a game process executed in the game apparatus 3 will be described with reference to FIGS. 10 to 18. Firstly, main data which are used in the game process will be described with reference to FIG. 10. FIG. 10 is a diagram illustrating the main data stored in the main memory 13 of the game apparatus 3. As illustrated in FIG. 10, the main memory 13 stores a game program 60, operation data 61, game process data 64, and the like. Note that, in addition to the data of FIG. 10, the main memory 13 stores data required for the game process, such as image data of various objects appearing in a game, data indicating various parameters of the objects, and the like.

The whole or a part of the game program 60 is read from the optical disc 4 and stored into the main memory 13 with appropriate timing after the game apparatus 3 is powered ON. The game program 60 includes a program required for execution of a game process for calculating the tilt of the controller 5 and notifying the player based on the calculated tilt, and the like.

The operation data 61 is operation data which are transmitted from the controller 5 to the game apparatus 3. The operation data 61 stores acceleration data 62 and marker coordinate data 63. Although not shown, the operation data 61 may store operation button data. The operation button data is data indicating operations which are performed with respect to the buttons 32a to 32i of the operation section 32 (whether or not each of the buttons 32a to 32i has been pressed down). Note that, as described above, since the operation data is transmitted from the controller 5 to the game apparatus 3 at a rate of one per 1/200 sec, the operation data stored in the main memory 13 is updated at that rate. Also, the main memory 13 stores only latest operation data (which was acquired most recently).

The acceleration data 62 is data indicating an acceleration (acceleration vector) detected by the acceleration sensor 37. Here, the acceleration data 62 is data indicating an acceleration vector A=(Ax, Ay, Az) in relation to the directions of the three axes (X-, Y- and Z axes) of FIG. 3.

The marker coordinate data 63 is data indicating coordinates calculated by the image processing circuit 42 of the image capture information computing section 35, i.e., the marker coordinates. The marker coordinates are represented by a coordinate system for representing a position on a plane corresponding to the captured image. Note that, when the image capturing device 40 captures the images of the two markers 6R and 6L, two sets of marker coordinates are calculated. On the other hand, when only one of the markers 6R and 6L is positioned within a range which enables the image capturing device 40 to capture an image, the image capturing device 40 captures the image of only one of the two markers, so that only one set of marker coordinates is calculated. Also, when none of the markers 6R and 6L is positioned within the range which enables the image capturing device 40 to capture an image, the image capturing device 40 captures no marker, so that no marker coordinates are calculated. Therefore, the marker coordinate data may indicate two sets of marker coordinates, one set of marker coordinates, or no marker coordinates.

The game process data 64 is data used in a game process (FIGS. 13 and 14) described below. The game process data 64 includes tilt data 65, recognition range data 66, reference value data 69, pointing position data 70, and the like.

Figure 11:
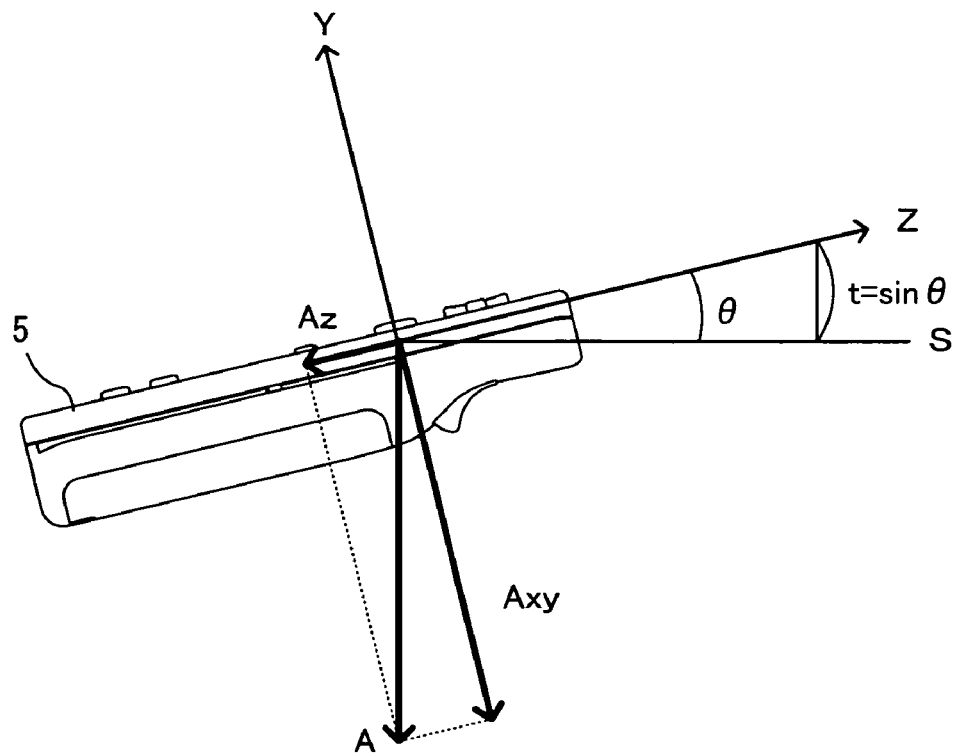
FIG. 11 is a diagram for describing a method for calculating a tilt of the controller 5.

The tilt data 65 is data indicating the tilt of the controller 5. In this exemplary embodiment, the tilt data 65 indicates the tilt of the controller 5 in relation to a direction horizontal to the ground (a direction perpendicular to the gravity direction). FIG. 11 is a diagram for describing a method for calculating the tilt of the controller 5. In this exemplary embodiment, the tilt of the controller 5 is represented by a tilt value t indicating a sine function (sin θ) between a plane S horizontal to the ground and the Z axis of the controller 5 (see FIG. 11). Therefore, the tilt value t can be calculated based on the Z component Az of the acceleration vector A detected by the acceleration sensor 37, and the combined vector Axy of the X and Y components of the acceleration vector A. Note that, in this exemplary embodiment, the tilt data 65 is calculated at a rate of one per 1/60 sec, and only latest tilt data (which was acquired most recently) is stored in the main memory 13.

Figure 12:
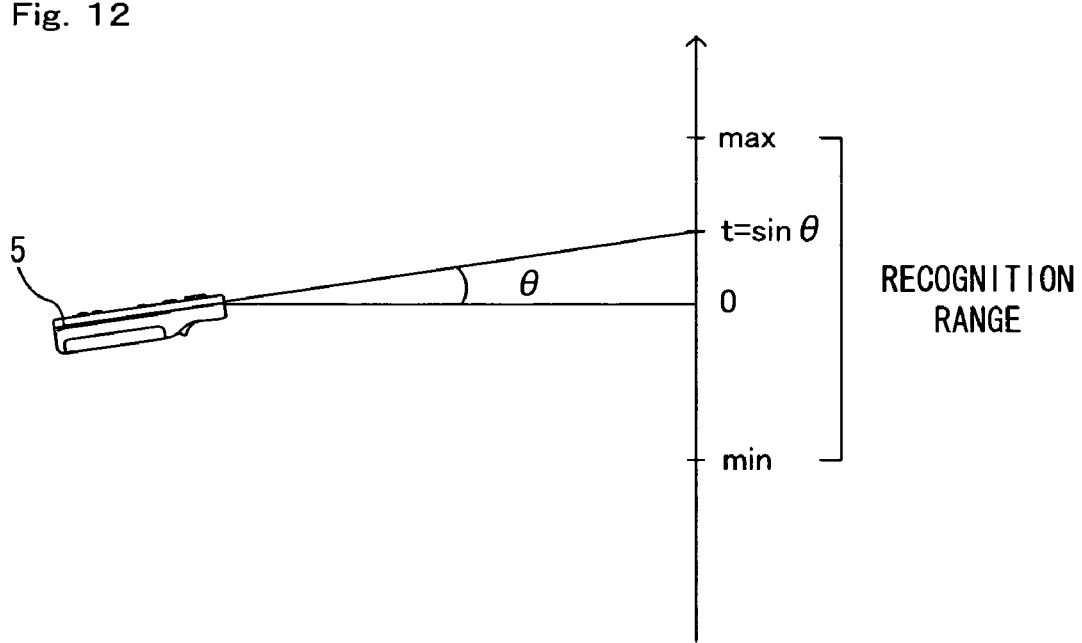
FIG. 12 is a conceptual diagram illustrating a tilt value t and a recognition range.

The recognition range data 66 is data indicating a recognition range. The recognition range is a range within which the markers 6R and 6L can be recognized (detected) and is in relation to the tilt value t of the controller 5. FIG. 12 is a conceptual diagram illustrating the tilt value t and the recognition range. As described above, the tilt of the controller 5 is represented by the tilt value t. Therefore, as illustrated in FIG. 12, the recognition range indicates the range of the tilt value t. Specifically, the recognition range data 66 includes maximum value data 67 and minimum value data 68. The maximum value data 67 is data indicating a maximum value (max) of the tilt value t within the recognition range. The minimum value data 68 is data indicating a minimum value (min) of the tilt value t within the recognition range.

The reference value data 69 is data indicating a reference value (c) for determining whether the tilt of the controller 5 is oriented excessively upward or downward. In other words, the game apparatus 3 compares the reference value c with the current tilt value t of the controller 5 to determine whether the controller 5 is oriented excessively upward or downward. The reference value data 69 is calculated based on the recognition range data 66.

The pointing position data 70 is data indicating the pointing position. The pointing position data 70 is calculated based on the marker coordinate data 63. The game apparatus 3 executes a game process using the pointing position indicated by the pointing position data 70 as a game input.

Figure 13:
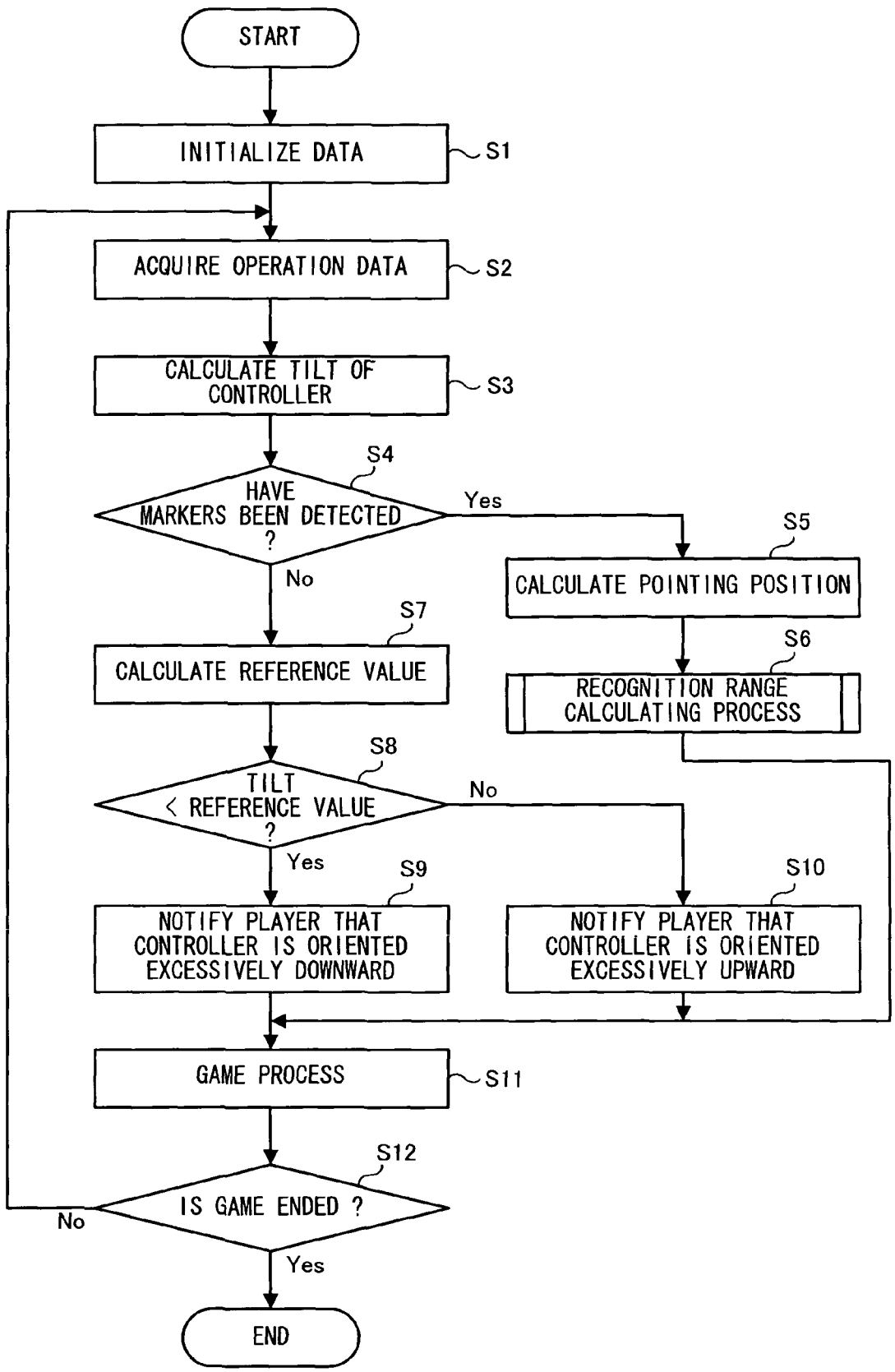
FIG. 13 is a main flowchart illustrating a process executed by the game apparatus 3.

Next, a detail of a process performed by the game apparatus 3 will be described with respect to FIGS. 13 to 18. FIG. 13 is a main flowchart illustrating a process executed by the game apparatus 3. When the game apparatus 3 is powered ON and the optical disc 4 storing a game program is loaded into the game apparatus 3, the CPU 10 of the game apparatus 3 executes a boot program stored in a boot ROM (not shown), thereby initializing each unit, such as the main memory 13 and the like. Thereafter, the game program stored on the optical disc 4 is read into the main memory 13, and the game program is executed by the CPU 10. The flowchart of FIG. 13 indicates a process which is executed after completion of the above-described process. Note that, in the flowchart of FIG. 13, a description is mainly focused to a situation that, when the markers 6R and 6L are not detected by the image capturing device 40, the player is notified of a direction in which the controller 5 is deviated, based on the tilt of the controller 5. Processes which do not relate to the exemplary embodiments will not be described.

In step S1 of FIG. 13, initially, the CPU 10 initializes the recognition range data 66 which is used in a game process. Specifically, the maximum value data 67 of the recognition range data 66 is set so that the maximum value max=0, while the minimum value data 68 of the recognition range data 66 is set so that the minimum value min=0.

After step S1, a process loop of steps S2 to S12 is repeatedly executed during execution of a game. Note that the process loop is executed at a rate of one per frame time (e.g., 1/60 sec).

In step S2, the CPU 10 acquires operation data from the controller 5. Specifically, the communication unit 16 receives operation data transmitted from the controller 5, and the received operation data is stored into the main memory 13. Thereby, the acceleration data 62 indicating a current acceleration of the controller 5, and the marker coordinate data 63 indicating current marker coordinates, are stored into the main memory 13.

In the following step S3, the CPU 10 calculates the tilt of the controller 5. The tilt value t indicating the tilt of the controller 5 is calculated using the acceleration data 62 stored in the main memory 13. As described above, in this exemplary embodiment, the tilt of the controller 5 is represented by the sine function (sin θ) of an angle θ between the plane S horizontal to the ground and the Z axis of the controller 5 (see FIG. 11). Specifically, the tilt value t is calculated by:

$$t = \sin\theta = -Az/\sqrt{(Axy \times Axy + Az \times Az)} \quad (1)$$

where Az is a variable indicating the Z component of an acceleration vector A indicated by the acceleration data 62, and Axy is a variable indicating the magnitude of the combined vector of the X and Y components of the acceleration vector A. Data indicating the tilt value t calculated by expression (1) is stored as the tilt data 65 into the main memory 13.

Note that the reason why the tilt value t is calculated using the variable Az and the variable Axy in expression (1), is that the tilt of the controller 5 can be correctly calculated even when the controller 5 is tilted in a rotational direction around the Z axis. Note that, when it is not assumed that the controller 5 is tilted in the rotational direction during use (i.e., it is assumed that the X axis is fixed substantially perpendicular to the gravity direction), the tilt value t may be calculated using the Y component Ay of the acceleration vector A instead of the variable Axy. In another exemplary embodiment, the angle θ may be calculated by expression (1), and may be used as a tilt value indicating the tilt of the controller 5. Alternatively, as a tilt value, a cosine function of an angle between the plane S horizontal to the ground and the Y axis of the controller 5 may be used.

Alternatively, the tilt value t may not be calculated using the acceleration vector itself detected by the acceleration sensor 37, and may be calculated using a vector obtained by subjecting the acceleration vector to a predetermined conversion process. Specifically, in the conversion process, the acceleration vector is converted into a vector which varies, following the acceleration vector. More specifically, the converted vector a=(ax, ay, az) is calculated by:

$$ax = bx + (Ax - bx) \cdot C1$$

$$ay = by + (Ay - by) \cdot C1$$

$$az = bz + (Az - bz) \cdot C1 \quad (2)$$

where the acceleration vector detected by the acceleration sensor 37 is represented by (Ax, Ay, Az), and the vector obtained by the previous conversion process is represented by (bx, by, bz). Note that it is assumed that, when the vector a is initially calculated, (bx, by, bz)=(0, 0, 0). Also, the constant C1 is previously set to be in the range of 0<C1<1. For example, when the controller 5 is rapidly moved, the acceleration vector detected by the acceleration sensor 37 varies rapidly, so that the tilt of the controller 5 is unlikely to be correctly followed. By the conversion process, the rapid variation of the acceleration vector can be relaxed, thereby making it possible to obtain a vector which correctly follows the tilt of the controller 5. Therefore, by calculating the tilt value t using the vector obtained by the conversion process, the tilt of the controller 5 can be correctly calculated.

Referring back to FIG. 13, in step S4 following step S3, the CPU 10 determines whether or not the markers 6R and 6L have been detected by the image capturing device 40. The determination in step S4 is executed with reference to the marker coordinate data 63 stored in the main memory 13. Specifically, when the marker coordinate data 63 indicates two sets of marker coordinates, it is determined that the markers 6R and 6L have been detected. On the other hand, when the marker coordinate data 63 indicates one set of marker coordinates or when the marker coordinate data 63 indicates no marker coordinates, it is determined that the markers 6R and 6L have not been detected. When the determination result in step S4 is positive, a process of step S5 is executed. On the other hand, when the determination result in step S4 is negative, a process of step S7 described below is executed.

Note that the determination process of step S4 is a process for determining whether or not the markers required for calculating the pointing position have been detected (i.e., whether or not the pointing position can be calculated). In this exemplary embodiment, it is assumed that two sets of marker coordinates are used to calculate the pointing position. In another exemplary embodiment, it is possible to use only one set of marker coordinates to calculate the pointing position. For example, assuming that two sets of marker coordinates have been detected with timings before and after predetermined timing, even when only one set of marker coordinates has been detected with the predetermined timing, two sets of marker coordinates can be calculated by interpolation to obtain the pointing position. Therefore, in another exemplary embodiment, assuming that a process of calculating the pointing position using one set of marker coordinates is employed, the result of step S4 may be determined to be positive even when only one set of marker coordinates has been detected.

In step S5, the CPU 10 calculates the pointing position. The pointing position is calculated based on the marker coordinates indicated by the marker coordinate data 63 stored in the main memory 13. The calculated data indicating the pointing position is stored as the pointing position data 70 into the main memory 13. Note that the pointing position may be calculated using any algorithm which can calculate the pointing position on the screen from the captured image. As an example, it is contemplated that the pointing position is calculated using an algorithm described below.

Hereinafter, an exemplary method for calculating the pointing position will be described. Initially, the CPU 10 calculates a middle point between two sets of marker coordinates indicated by the marker coordinate data 63. A position of the middle point is represented by an xy coordinate system for representing a position on a plane corresponding to the captured image. In the xy coordinate system, an upper left corner of the captured image is assumed to be the origin, a downward direction is assumed to be the positive direction of the y axis, and a rightward direction is assumed to be the positive direction of the x axis. Next, the CPU 10 converts coordinates indicating the position of the middle point into coordinates in a coordinate system (x'y' coordinate system) for indicating a position on the screen of the television 2. Note that, in the x'y' coordinate system, an upper left corner of the screen is assumed to be the origin, a downward direction is assumed to be the positive direction of the y' axis, and a rightward direction is assumed to be the positive direction of the x' axis. In this case, the conversion is executed as follows. Specifically, the sign of the x component of the coordinates of the middle point is inverted and is scaled by a predetermined factor (e.g., a factor which causes the length in the x-axis direction of the captured image to be equal to the length in the x'-axis direction of the screen of the television 2), thereby making it possible to obtain the x' component of the pointing position. Also, the y component of the coordinates of the middle point is scaled by a predetermined factor (e.g., a factor which causes the length in the y-axis direction of the captured image to be equal to the length in the y'-axis direction of the screen of the television 2), thereby making it possible to obtain the y' component of the pointing position. A position represented by the thus-calculated x' and y' coordinate values is the pointing position. As a method for calculating the pointing position more correctly, the middle point between the two sets of marker coordinates is rotated around a center of the captured image so that a vector connecting the two sets of marker coordinates is parallel to the y axis, and the conversion process is executed with respect to the rotated middle point. By executing the correction process by such rotation, the pointing position can be correctly calculated even when the controller 5 is tilted or the like.

In step S6 following step S5, the CPU 10 executes a recognition range calculating process for calculating the recognition range. Hereinafter, a detail of the recognition range calculating process will be described with reference to FIG. 14.

Figure 14:
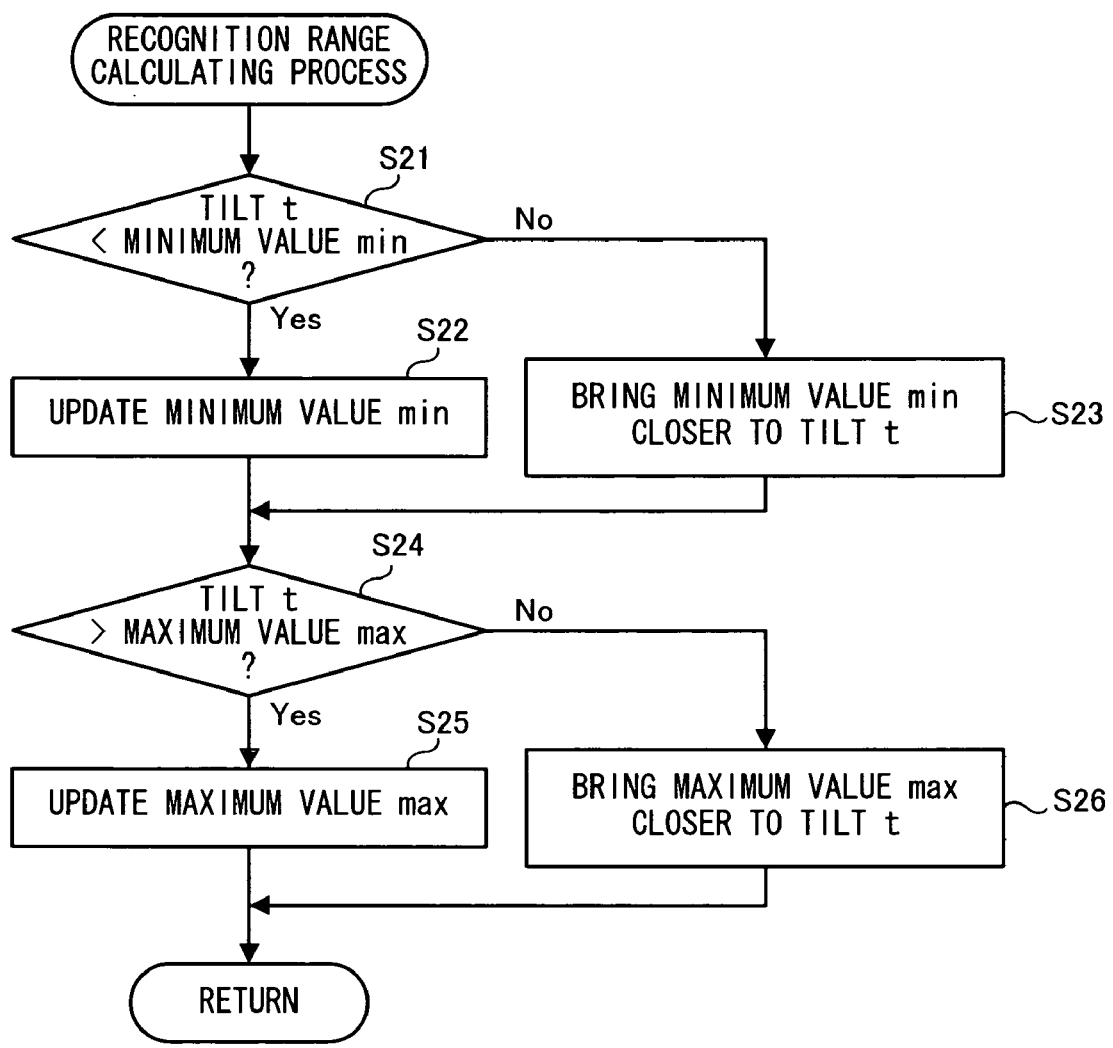
FIG. 14 is a flowchart illustrating a recognition range calculating process (step S6) of FIG. 13.

FIG. 14 is a flowchart illustrating the recognition range calculating process (step S6) of FIG. 13. In the recognition range calculating process, initially, in step S21, the CPU 10 determines whether or not the current tilt value t is smaller than the minimum value min of the recognition range. The determination in step S21 is executed using the tilt value t indicated by the tilt data 65 stored in the main memory 13 and the minimum value min indicated by the minimum value data 68 stored in the main memory 13. The process in step S21 is a process for determining whether or not the minimum value min of the recognition range is updated to a smaller value. When the result of the determination in step S21 is positive, a process of step S22 is executed. On the other hand, when the determination result of step S21 is negative, a process of step S23 is executed.

In step S22, the CPU 10 changes the minimum value min of the recognition range into a value equal to the tilt value t. Specifically, the minimum value data 68 is updated so that the value of the minimum value min indicated by the minimum value data 68 is equal to the tilt value t indicated by the tilt data 65. Thereby, the recognition range is changed so that its lower limit value is reduced.

On the other hand, in step S23, the CPU 10 changes the minimum value min of the recognition range into a value closer to the tilt value t. Specifically, the changed minimum value min is calculated by:

$$\text{min} = \text{min}' + (t - \text{min}') \cdot C2 \tag{3}$$

where min' is a variable which is a minimum value before changing, i.e., a minimum value indicated by the minimum value data 68 stored in the main memory 13, and C2 is a constant value which is previously defined within 0<C2<1. Data indicating the minimum value min changed by expression (3) is stored as new minimum value data 68 into the main memory 13. Thus, by the process of step S23, the recognition range is changed so that its lower limit value is increased.

Following step S22 or S23, a process of step S24 is executed. In step S24, the CPU 10 determines whether or not the current tilt value t is larger than the maximum value max of the recognition range. The determination in step S21 is executed using the tilt value t indicated by the tilt data 65 stored in the main memory 13 and the maximum value max indicated by the maximum value data 67 stored in the main memory 13. The process of step S24 is a process for determining whether or not the maximum value max of the recognition range is updated to a larger value. When the result of the determination in step S24 is positive, a process of step S25 is executed. On the other hand, when the determination result of step S24 is negative, a process of step S26 is executed.

In step S25, the CPU 10 changes the maximum value max of the recognition range into a value equal to the tilt value t. Specifically, the maximum value data 67 is updated so that the value of the maximum value max indicated by the maximum value data 67 is equal to the tilt value t indicated by the tilt data 65. Thereby, the recognition range is changed so that its upper limit value is increased.

On the other hand, in step S26, the CPU 10 changes the maximum value max of the recognition range into a value closer to the tilt value t. Specifically, the changed maximum value max is calculated by:

$$\max = \max' + (t - \max') \cdot C2 \tag{4}$$

where the max' is a variable which is a maximum value before changing, i.e., a maximum value indicated by the maximum value data 67 stored in the main memory 13. Data indicating the maximum value max changed by expression (4) is stored as new maximum value data 67 into the main memory 13. Thus, by the process of step S26, the recognition range is changed so that its upper limit value is reduced.

Figure 15:
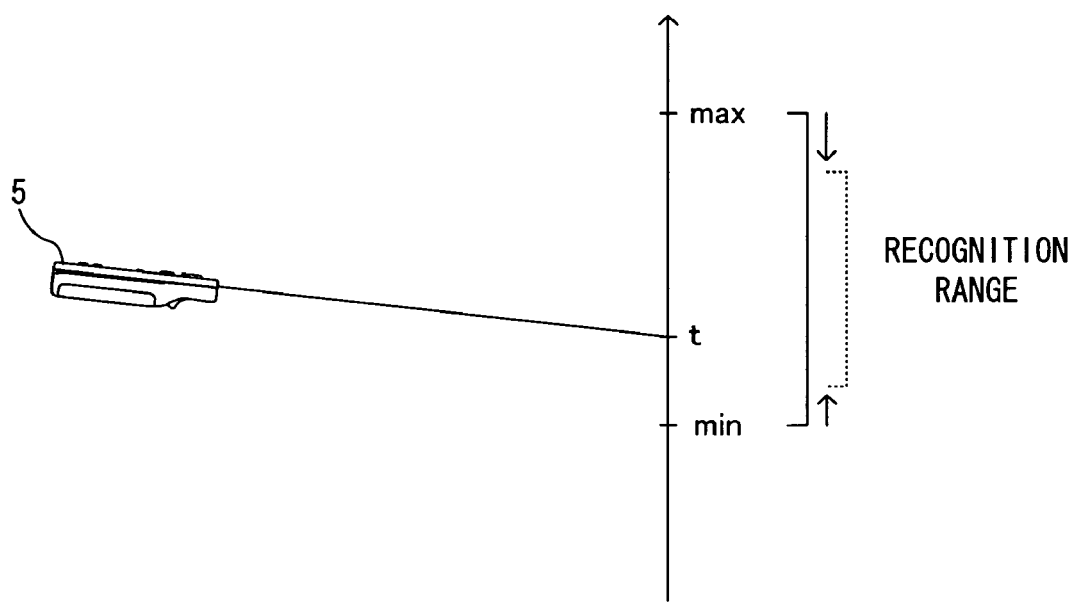
FIG. 15 is a diagram for describing a process of changing the recognition range.
Figure 16:
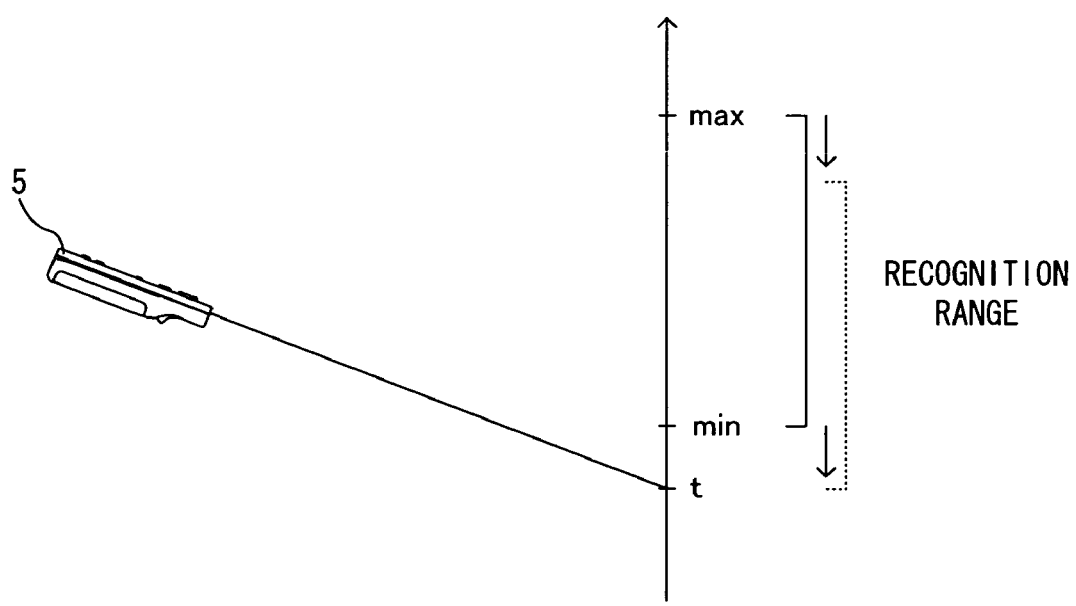
FIG. 16 is a diagram for describing the process of changing the recognition range.

After the process of step S25 or S26, the CPU 10 ends the recognition range calculating process. By the recognition range calculating process, the maximum value and the minimum value of the recognition range are changed. FIGS. 15 and 16 are diagrams for describing a recognition range changing process. As illustrated in FIG. 15, when the current tilt value t is present within the recognition range, the processes of steps S23 and S26 are executed. Therefore, in this case, the maximum value of the recognition range is changed into a smaller value, while the minimum value of the recognition range is changed into a larger value. In other words, the recognition range is changed into a narrower range (see arrows in FIG. 15). On the other hand, as illustrated in FIG. 16, when the current tilt value t is smaller than the minimum value of the recognition range, the processes of steps S22 and S26 are executed. Therefore, in this case, both the maximum value and the minimum value of the recognition range are changed into smaller values (the amounts of changes in the maximum value and the minimum value are different from each other). In other words, the whole recognition range is shifted in a direction which reduces the values thereof (see arrows in FIG. 16). Although not shown, when the current tilt value t is larger than the maximum value of the recognition range, the processes of steps S23 and S25 are executed, and as a result, the whole recognition range is shifted in a direction which increases the values thereof.

As described above, in this exemplary embodiment, when the markers 6R and 6L are detected (the determination result in step S4 is positive), the recognition range is updated in units of one frame time. Since the recognition range is set based on the tilt value t obtained when the markers 6R and 6L are detected, the recognition range represents a range within which the markers 6R and 6L can be detected. Although specified in detail below, the recognition range (specifically, a middle value of the recognition range) is used to determine whether the controller 5 is oriented excessively upward or downward. In this exemplary embodiment, by using the recognition range indicating a range within which the markers 6R and 6L can be detected, the game apparatus 3 can correctly execute the above-described determination, depending on an actual positional relationship between the markers 6R and 6L and the controller 5.

Note that the recognition range may be any range in which the markers 6R and 6L can be detected. Therefore, the recognition range may be set to include at least some of one or more tilt values calculated while it is determined that the markers 6R and 6L can be detected (the determination result of step S4 is positive). For example, in another exemplary embodiment, the game apparatus 3 may set a range from the maximum value to the minimum value of one or more tilt values t calculated while the markers 6R and 6L are detected, as the recognition range.

Referring back to FIG. 13, in step S7, the CPU 10 calculates the reference value c. The reference value c is calculated using the recognition range data 66 stored in the main memory 13. Specifically, the reference value c is calculated by expression (5) below based on the maximum value max indicated by the maximum value data 67 and the minimum value min indicated by the minimum value data 68.

$$c = (\max + \min)/2 \tag{5}$$

Figure 17:
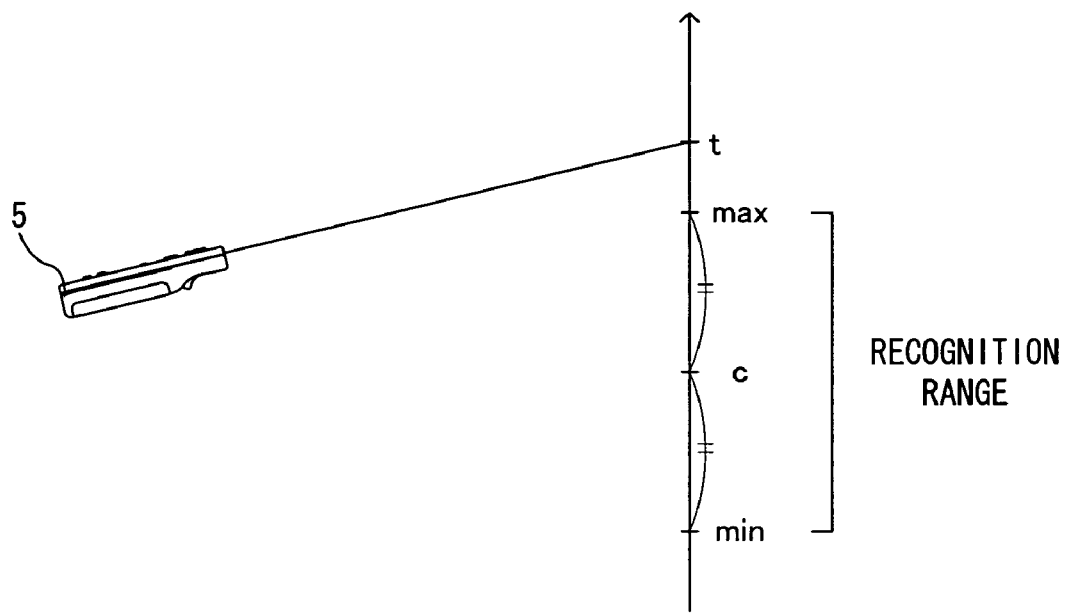
FIG. 17 is a diagram for describing a determination process of step S8.

As indicated by expression (5), the reference value c is calculated as a middle value of the recognition range (an average value of the maximum value max and the minimum value min) (see FIG. 17). Data indicating the calculated reference value c is stored as the reference value data 69 into the main memory 13.

In the following step S8, the CPU 10 determines whether or not the current tilt value t is smaller than the reference value c. The determination in step S8 is executed using the tilt value t indicated by the tilt data 65 stored in the main memory 13 and the reference value c indicated by the reference value data 69 stored in the main memory 13.

FIG. 17 is a diagram for describing the determination process of step S8. As described above, the recognition range indicates a range in which the markers 6R and 6L can be detected by the image capturing device 40 of the controller 5. The reference value c which is a middle value of the recognition range also indicates the tilt of the controller 5 at which the markers 6R and 6L can be detected by the image capturing device 40, as is similar to the recognition range. Specifically, a situation where the tilt value t is larger than the reference value c, is a situation where a tilt (the tilt value t) when the markers 6R and 6L are no longer detected is larger than a tilt (the reference value c) at which the markers 6R and 6L can be detected (in other words, the controller 5 is oriented upward) as illustrated in FIG. 17. Therefore, in this case, it can be determined that the controller 5 is oriented excessively upward. Conversely, a situation where the tilt value t is smaller than the reference value c, is a situation where a tilt when the markers 6R and 6L are no longer detected is smaller than a tilt at which the markers 6R and 6L can be detected (in other words, the controller 5 is oriented downward). In this case, it can be determined that the controller 5 is oriented excessively downward. Therefore, by the determination process of step S8, it can be determined whether the controller 5 is oriented excessively upward or downward as compared to the situation in which the markers 6R and 6L can be detected. When the result of the determination in step S8 is positive, a process of step S9 is executed. On the other hand, when the determination result of step S8 is negative, a process of step S10 is executed.

Figure 18:
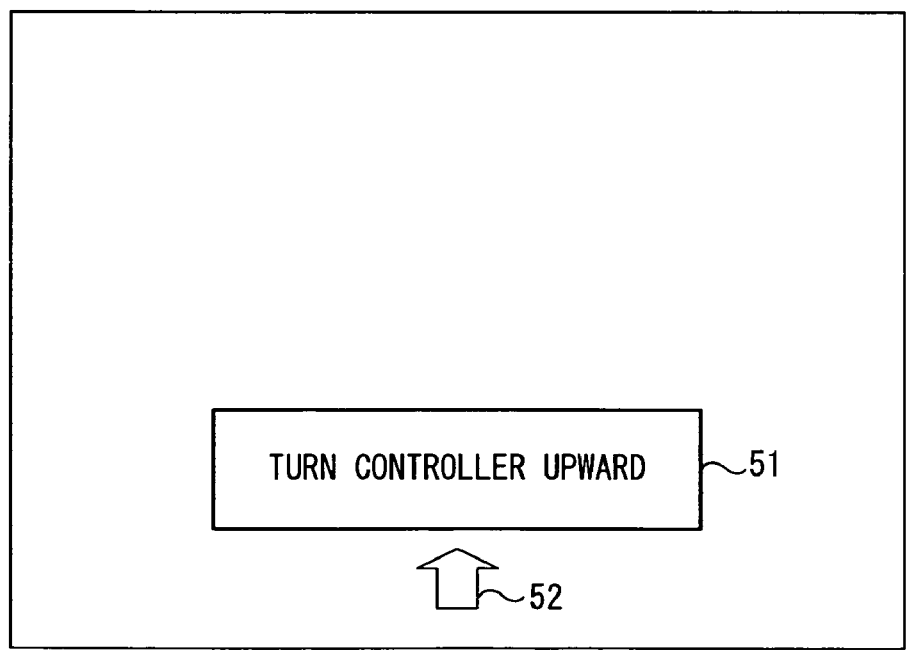
FIG. 18 is a diagram illustrating an exemplary image for notifying the player.

In step S9, the CPU 10 notifies the player that the controller 5 is oriented excessively downward. Specifically, an image which prompts the player to orient the controller 5 in a correct direction, i.e., turn the controller 5 upward, is displayed on the television 2. FIG. 18 is a diagram illustrating an exemplary image for notifying the player. Note that the image of FIG. 18 is an image which is displayed in step S9, i.e., an image which is displayed when the controller 5 is oriented excessively downward, so that the markers 6R and 6L are not detected. The image of FIG. 18 includes a sentence 51 which is "turn controller upward" and an arrow 52 indicating an upward direction. By the displayed image, the player can know that the controller 5 is oriented excessively downward.

On the other hand, in step S10, the CPU 10 notifies the player that the controller 5 is oriented excessively upward. Specifically, an image which prompts the player to orient the controller 5 in a correct direction, i.e., turn the controller 5 downward, is displayed on the television 2. In step S10, for example, a sentence "turn controller downward" and an arrow indicating a downward direction are displayed on the screen of the television 2. Thereby, the player can know that the controller 5 is oriented excessively upward.

Note that the images displayed in steps S9 and S10 are not limited to those which prompt the player to orient the controller 5 in a correct direction. Any image may be used which provides information which varies depending on the determination result of step S8 (the result of comparison of the tilt value t and the reference value c) and is in relation to the tilt of the controller 5. For example, the image may be an image which indicates the current tilt of the controller 5 (e.g., "oriented excessively downward". The notification in step S9 and S10 may be executed by sound output from the loudspeaker 2a or 49 instead of a display.

Note that, in this exemplary embodiment, the notification is assumed to be executed immediately after it is determined that the pointing position cannot be calculated (the determination result of step S4 is negative). Here, in another exemplary embodiment, the notification may be executed under a condition that the determination that the pointing position cannot be calculated continues for a predetermined period of time.

Following step S6, S9 or S10, a process of step S11 is executed. In step S11, the CPU 10 executes a game process depending on a game operation performed by the player. Specifically, a game process is executed based on a pointing position indicated by the pointing position data 70 stored in the main memory 13. Note that, when the process of step S11 is executed following step S9 or S10, the pointing position indicated by the pointing position data 70 is not a position which is currently pointed by the controller 5, and is a pointing position which is calculated when the markers 6R and 6L have been detected most recently. Such a pointing position may not be a correct game input which is intended by the player. Therefore, the process of step S11 is executed following step S9 or S10, the CPU 10 may execute a process of temporarily suspending the game.

In the following step S12, the CPU 10 determines whether or not to end the game. For example, the determination of step S12 is executed based on whether or not the game is cleared or over, whether or not the player has issued an instruction to end the game, or the like. When the result of the determination in step S12 is negative, the process of step S2 is executed again. Subsequently, the processes of steps S2 to S12 are repeatedly executed until it is determined in step S12 that the game is ended. On the other hand, when the determination result of step S12 is positive, the CPU 10 ends the game process of FIG. 13.

As described above, according to this exemplary embodiment, when the markers 6R and 6L are no longer detected, the game apparatus 3 calculates the tilt of the controller 5 using the detection result of the acceleration sensor 37. Based on the calculated tilt, the game apparatus 3 determines a direction in which the controller 5 should be turned, and notifies the player of the direction in which the controller 5 should be turned. Thereby, even when the player orients the controller 5 in a wrong direction, it is possible to notify the player of a correct direction.

Also, in this exemplary embodiment, the detection result of the acceleration sensor 37 is used to calculate the tilt of the controller 5. Thereby, the tilt can be calculated no matter whether or not the markers 6R and 6L have been detected. In other words, the current tilt of the controller 5 can be calculated even when the markers 6R and 6L cannot be detected. Therefore, it is possible to notify the player of a direction in which the controller 5 should be turned in relation to the current state. For example, even when the controller 5 is oriented excessively upward after the markers 6R and 6L are no longer detected due to an excessively downward orientation of the controller 5, the game apparatus 3 can recognize that state and notify the player of the current orientation (upward).

Figure 19:
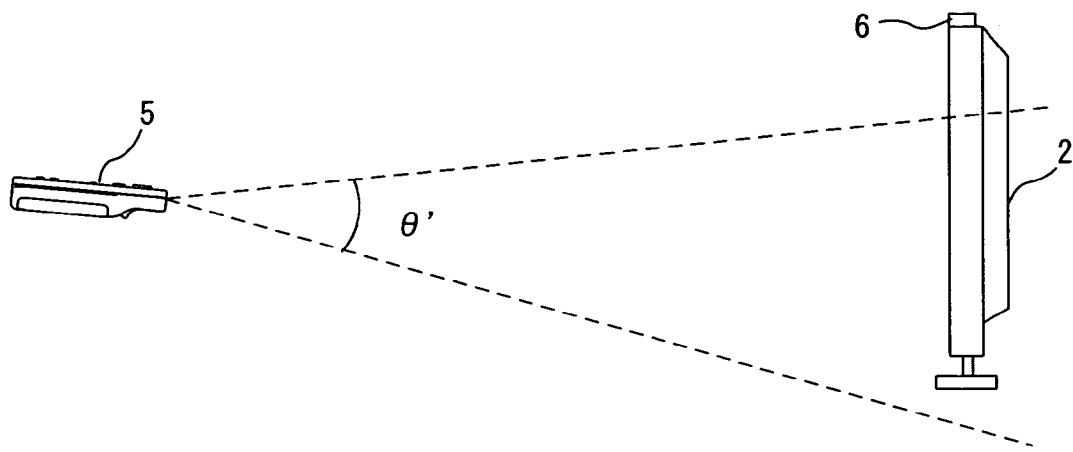
FIG. 19 is a diagram illustrating an exemplary positional relationship between the controller 5 and markers 6R and 6L.
Figure 20:
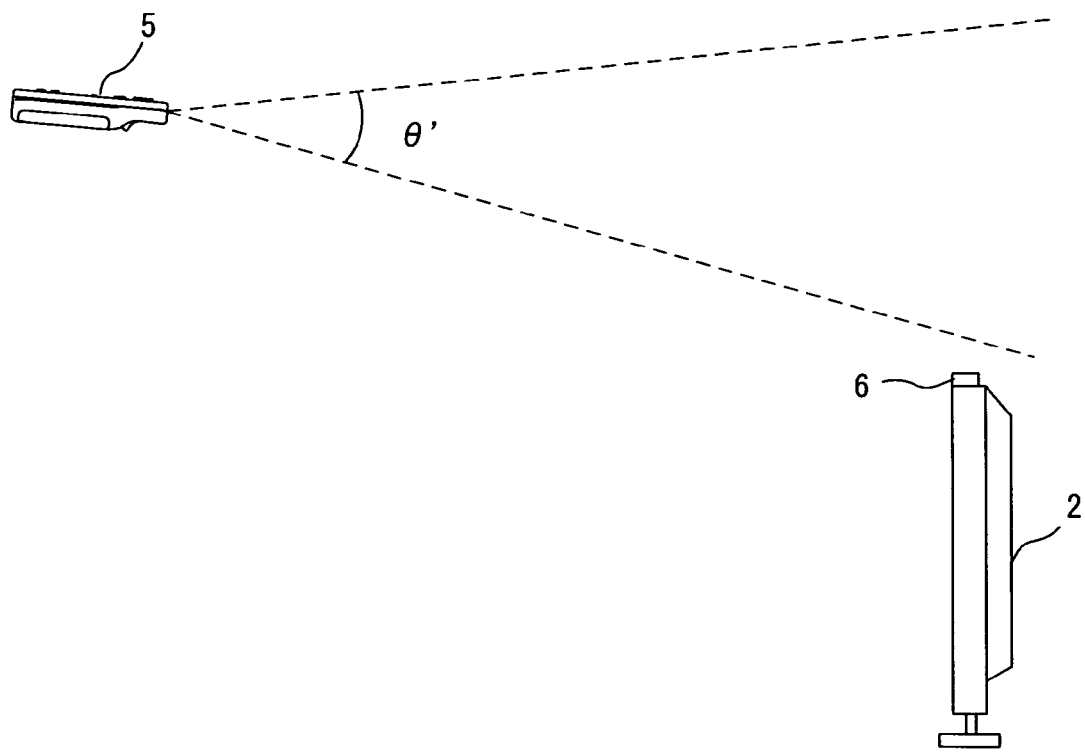
FIG. 20 a diagram illustrating an exemplary positional relationship between the controller 5 and the markers 6R and 6L.

The positional relationship between the controller 5 and the markers 6R and 6L varies, depending on the form of actual use by each player, such as the position of the player holding the controller 5, the attitude of the player performing a game (standing or sitting), the arrangement and placement of the markers 6R and 6L (above or below the television 2), the position of the television 2, or the like. FIGS. 19 and 20 are diagrams illustrating examples of the positional relationship between the controller 5 and the markers 6R and 6L. The controller 5 may be positioned below the markers 6R and 6L (FIG. 19) or above the markers 6R and 6L (FIG. 20), depending on the form of use by each player.

The result of determination of whether the controller 5 is oriented excessively upward or downward, varies depending on the positional relationship between the controller 5 and the markers 6R and 6L. For example, both in FIG. 19 and FIG. 20, the tilt of the controller 5 is the same, and the markers 6R and 6L are not detected. Although the tilt of the controller 5 is the same, in FIG. 19 it needs to be determined that the controller 5 is oriented excessively downward, while in FIG. 20 it needs to be determined that the controller 5 is oriented excessively upward. However, if the determination is executed only based on the tilt of the controller 5, the result of the determination may not be correct, since the tilt of the controller 5 is the same.

In view of the difference between the form of actual use by each player as described above, in this exemplary embodiment a reference value c which is a reference for determining whether the controller 5 is oriented excessively upward or downward, is determined based on the tilt of the controller 5 which is obtained when the markers 6R and 6L are detected (step S7). In order to continue to operate the controller 5 at a position below the markers 6R and 6L as illustrated in FIG. 19, the controller 5 needs to be tilted upward above a plane horizontal to the ground during the operation, so that the maximum value and the minimum value of the recognition range are larger than when the markers 6R and 6L are present within the visual field of the controller 5 positioned parallel to a plane horizontal to the ground. As a result, the reference value c indicates a tilt upward above a plane horizontal to the ground. Conversely, when the controller 5 continues to be operated at a position above the markers 6R and 6L as illustrated in FIG. 20, the controller 5 needs to be tilted downward below a plane horizontal to the ground, so that the maximum value and the minimum value of the recognition range are smaller than when the markers 6R and 6L are present within the visual field of the controller 5 positioned parallel to a plane horizontal to the ground. As a result, the reference value c indicates a tilt downward below a plane horizontal to the ground. By comparison based on the reference value c, a direction in which the markers 6R and 6L are deviated is calculated. Therefore, even when the tilt of the controller 5 is the same and none of the markers 6R and 6L is detected, in FIG. 19 the reference value c indicates a tilt upward above a plane horizontal to the ground, so that it can be determined that the controller 5 is deviated downward, and in FIG. 20 the reference value c indicates a tilt below a plane horizontal to the ground, so that it can be determined that the controller 5 is deviated upward. In other words, in the determination process of step S8, it can be determined whether the controller 5 is oriented excessively upward or downward as compared to when the markers 6R and 6L can be detected. Therefore, according to this exemplary embodiment, correct determination can be executed, depending on the difference in the form of actual use.

Also, in this exemplary embodiment, in order to determine the reference value c, the recognition range indicating a range of the tilt of the controller 5 in which the markers 6R and 6L can be detected is calculated (step S6). Here, the form of use by the player may vary during a game. For example, the player, who has been sitting to play a game, may begin standing to play during the game, or the player, who has been standing to play a game, may begin sitting to play during the game. When the form of used by the player is changed during a game in such a manner, the range of the tilt of the controller 5 in which the markers 6R and 6L can be detected is changed. Therefore, in this case, the recognition range and the reference value c are also preferably changed, depending on the change in the range of the tilt of the controller 5.

Therefore, in view of the change in the form of use during a game, in this exemplary embodiment the recognition range based on which the reference value c is determined is updated based on the tilt value t as required when the markers 6R and 6L are detected (step S6). Specifically, the maximum value and the minimum value of the recognition range are moved, following the tilt value t (steps S22, S23, S25 and S26). Thereby, even when the range of the tilt of the controller 5 in which the markers 6R and 6L can be detected is changed since the form of use by the player is changed during a game, the recognition range and the reference value c can be changed, depending on the change in the range of the tilt of the controller 5. Therefore, according to this exemplary embodiment, the recognition range can be correctly calculated, thereby making it possible to correctly calculate the reference value c. Therefore, it is possible to correctly determine whether the controller 5 is oriented excessively upward or downward.

Note that, in another exemplary embodiment, the following method may be used as a method for changing the recognition range and the reference value c, depending on a change in the form of use by the player during a game. Specifically, the CPU 10 of the game apparatus 3 may store into the main memory 13 one or more tilt values t which have been calculated for a predetermined period of time from the present to the past, in step S3 for example. When it is determined that the pointing position cannot be calculated (the determination result of step S4 is negative), the recognition range may be calculated based on one or more tilt values t which are stored in the main memory 13 at that time. Specifically, the recognition range is calculated so that the maximum value of the tilt values t stored in the main memory 13 is the upper limit value and the minimum value is the lower limit value. Alternatively, the recognition range may not be calculated, and an average value of one or more tilt values t stored in the main memory 13 may be used as the reference value c. By using these methods, as in this exemplary embodiment, even when the form of use by the player is changed during a game, and therefore, the range of the tilt of the controller 5 in which the markers 6R and 6L can be detected is changed, the recognition range can be set, depending on the change in the range of the tilt of the controller 5. Note that only the latest tilt value t may be stored, i.e., a storage area used is small, and therefore, the above-described exemplary embodiment is advantageous over the above-described method.

Also, in another exemplary embodiment, the game apparatus 3 may store into the main memory 13 a tilt value t which is calculated immediately before the markers 6R and 6L can be no longer detected, and may use the tilt value t as the reference value c.

Also, in the exemplary embodiment above, the middle value of the recognition range is used as the reference value c. Alternatively, the reference value c may be determined based on the recognition range. Alternatively, the number of reference values c may be plural. For example, in another exemplary embodiment, the maximum value max and the minimum value min of the recognition range may be used as the reference values c. In this case, in step S8 of FIG. 13, the CPU 10 of the game apparatus 3 determines which of the following (a) to (c) the tilt value t satisfies.

(a) the tilt value t>the maximum value max
(b) the maximum value max≧the tilt value t≧the minimum value min
(c) the minimum value min>the tilt value t When the tilt value t satisfies (a), the CPU 10 executes the process of step S10. When the tilt value t satisfies (b), the CPU 10 simply notifies the player that the markers 6R and 6L have not been detected, without indicating a direction in which the controller 5 is deviated. When the tilt value t satisfies (c), the CPU 10 executes the process of step S9.

Also, in the exemplary embodiment above, the recognition range is used to calculate the reference value c. Alternatively, the tilt value t may be directly used to calculate the reference value c. Note that, when the reference value c is calculated directly from the tilt value t, the process of step S6 in FIG. 13 is not required. For example, in step S7, the reference value c may be calculated so as to follow the tilt value t. Specifically, the game apparatus 3 may calculate the reference value c by:

$$c = c' + (t - c') \cdot C3 \qquad (6)$$

where c' is a variable which is a previously calculated reference value. Note that it is assumed that, when the reference value c is initially calculated, c'=0. C3 is a constant which is previously set within the range of 0<C3<1. As described above, the reference value c is calculated so as to follow the tilt value t, thereby making it possible to set an appropriate reference value c, depending on a change in the form of use by the player during a game, as in the exemplary embodiment above.

Note that, when the motion of the controller 5 is rapid, i.e., the amount of a change per unit time in the position and/or attitude of the controller 5 is large, the acceleration vector detected by the acceleration sensor 37 may not correctly correspond to the tilt of the controller 5. In this case, the tilt value t calculated based on the acceleration vector may not be correct. Therefore, in another exemplary embodiment, in the recognition range calculating process, a degree by which the maximum value max and the minimum value min of the recognition range are brought closer to the tilt value t may be determined based on the change amount of the position and/or attitude of the controller 5. Hereinafter, a variation of the recognition range calculating process will be described with reference to FIG. 21.

Figure 21:
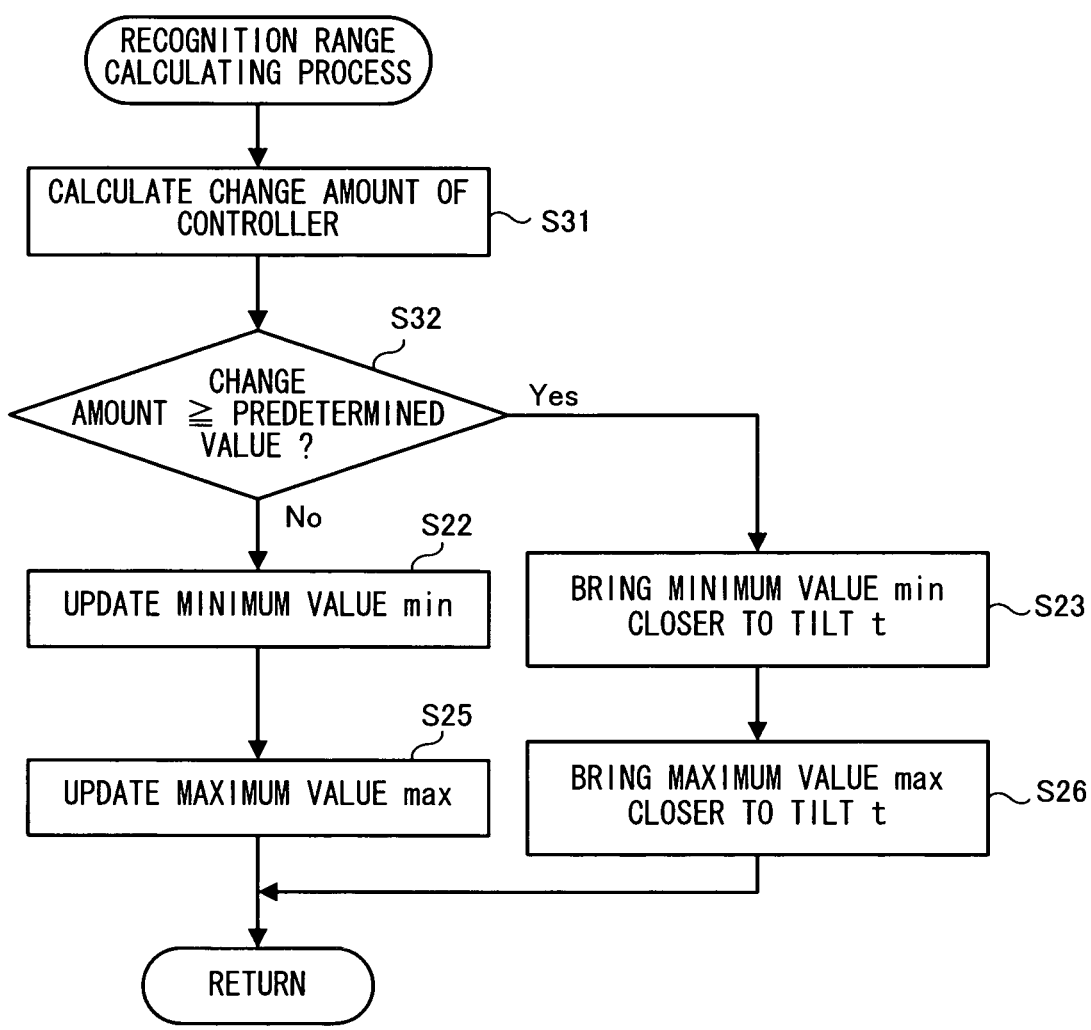
FIG. 21 is a flowchart illustrating a process in a variation of the recognition range calculating process.

FIG. 21 is a flowchart illustrating a process in the variation of the recognition range calculating process. In this variation, initially, in step S31, the CPU 10 calculates the amount of a change per unit time in the position and/or attitude of the controller 5. The change amount of the controller 5 is calculated as, for example, the amount of a change in the pointing position. More specifically, a distance between a pointing position calculated in a current frame and a pointing position calculated in the previous frame is defined as the change amount. Note that, as the change amount of the controller 5, the amount of a change in the tilt value t, i.e., a difference between a tilt value calculated in a current frame and a tilt value calculated in the previous frame may be used. Data (change amount data) indicating the change amount calculated in step S31 is stored into the main memory 13.

In the following step S32, the CPU 10 determines whether or not the change amount calculated in step S31 is larger than or equal to a predetermined value. In the determination of step S32, the change amount indicated by the change amount data stored in the main memory 13 and the predetermined value are used. By the process of step S32, it can be determined whether or not the controller 5 is rapidly moved. When the result of the determination in step S32 is negative, processes of steps S22 and step S25 similar to those in FIG. 14 are successively executed. On the other hand, when the determination result of step S32 is positive, processes of steps S23 and S26 similar to those in FIG. 14 are successively executed.

In the process of the variation above, a degree by which the maximum value max and the minimum value min of the recognition range are brought closer to the tilt value t is increased with a decrease in the change amount. Specifically, when the change amount of the controller 5 is large, i.e., the controller 5 is rapidly moved, the possibility that the tilt value t is not correct is considered to be high, and therefore, the degree by which the maximum value max and the minimum value min of the recognition range are brought closer to the tilt value t is relatively small. On the other hand, when the change amount of the controller 5 is small, the controller 5 is not rapidly moved, and therefore, the possibility that the tilt value t is correct is considered to be high, and therefore, the degree by which the maximum value max and the minimum value min of the recognition range are brought closer to the tilt value t is relatively large (in the example of FIG. 21, the maximum value and the minimum value are equal to the tilt value t). As described above, by updating the recognition range in view of the change amount of the controller 5, the recognition range can be more correctly calculated.

Note that, in the above-described exemplary embodiment, the game apparatus 3 is assumed to notify the player of an orientation of the controller 5 in relation to the vertical direction where the player is a reference. Here, in another exemplary embodiment, the player may be notified of an orientation of the controller 5 in relation to the lateral direction instead of the vertical direction. For example, when a gyro-sensor is used instead of the acceleration sensor 37, it is possible to calculate a tilt of the controller 5 in relation to the lateral direction. Therefore, the game apparatus 3 can determine whether the controller 5 is deviated in a left direction or in a right direction, and therefore, can notify the player whether the controller 5 should be turned in the left direction or in the right direction. When a gyro-sensor is used instead of the acceleration sensor 37, the player may be notified of orientations in relation to both the vertical direction and the lateral direction.

Although a game apparatus which employs a pointing position in a game process has been described in the exemplary embodiment above, the exemplary embodiments are not limited to game applications. The certain exemplary embodiments are also applicable to an information processing apparatus which calculates a pointing position pointed by an input device, and uses the pointing position as an input for any process.

As described above, the exemplary embodiments can be used as, for example, a game apparatus or a game program in order to notify the user that a pointing position pointed by an input device is deviated from the screen even when an image of a marker is not captured.

While certain exemplary embodiments have been described in detail, the foregoing detailed description is in all aspects illustrative and not restrictive. It is understood that numerous other modifications and variations can be devised without departing from the exemplary embodiments described herein.

What is claimed is:

1. A non-transitory computer readable storage medium storing an information processing program executable by a computer included in an information processing apparatus which can communicate with an input device performing a pointing action by using an image capturing device for capturing an image of a target object, and calculating a pointing position on a screen of a display device based on the image captured by the image capturing device, wherein
    the input device comprises a motion-attitude detector configured to detect a motion or an attitude of the input device,
    the information processing program causing the computer to execute:
    calculating a tilt value indicating a tilt of the input device using a result of detection by the motion-attitude detector;
    determining whether or not the pointing position can be calculated based on the image captured by the image capturing device;
    comparing the calculated tilt value with a reference value when the pointing position cannot be calculated based on the captured image; and
    outputting information about the tilt of the input device based on the comparing.

2. The storage medium according to claim 1, wherein
    the calculating step and the determining are repeatedly executed, and
    the information processing program causes the computer to further execute:
    calculating the reference value based on one or more tilt values calculated while the pointing position can be calculated.

3. The storage medium according to claim 2, wherein
    the information processing program causes the computer to further execute:
    calculating a tilt range based on the one or more tilt values calculated while the pointing position can be calculated, and
    in the reference value calculating, the computer calculates the reference value based on the tilt range.

4. The storage medium according to claim 3, wherein, in the reference value calculating, the computer calculates an average value between an upper limit value and a lower limit value of the tilt range as the reference value.

5. The storage medium according to claim 3, wherein, in the range calculating, the computer changes the tilt range so that an upper limit value and a lower limit value of the tilt range are brought closer to the tilt value, every time the tilt value is calculated.

6. The storage medium according to claim 5, wherein
the information processing program causes the computer to further execute:
calculating an amount of a change in a position and/or an attitude of the input device, and
in the range calculating, the computer increases a degree by which the upper limit value and the lower limit value of the tilt range are brought closer to the tilt value, with a decrease in the change amount.

7. The storage medium according to claim 6, wherein, in the change amount calculating, the computer uses, as the change amount of the input device, an amount of a change in the pointing position calculated based on the image captured by the image capturing device.

8. The storage medium according to claim 4, wherein, in the range calculating, the computer changes the tilt range so that an upper limit value and a lower limit value of the tilt range are brought closer to the tilt value, every time the tilt value is calculated.

9. The storage medium according to claim 8, wherein
the information processing program causes the computer to further execute:
calculating an amount of a change in a position and/or an attitude of the input device, and
in the range calculating, the computer increases a degree by which the upper limit value and the lower limit value of the tilt range are brought closer to the tilt value, with a decrease in the change amount.

10. The storage medium according to claim 9, wherein, in the change amount calculating, the computer uses, as the change amount of the input device, an amount of a change in the pointing position calculated based on the image captured by the image capturing device.

11. The storage medium according to claim 2, wherein
the information processing program causes the computer to further execute:
storing a tilt value calculated during a period of time from the present to the past, of the one or more tilt values calculated while it is determined that the pointing position can be calculated, into a storage of the information processing apparatus, and
in the reference value calculating, the computer calculates the reference value based on a tilt value stored in the storage when it is determined that the pointing position cannot be calculated.

12. The storage medium according to claim 2, wherein, in the reference value calculating, the computer uses a most recent tilt value of the one or more tilt values calculated while the pointing position can be calculated, as the reference value.

13. The storage medium according to claim 2, wherein, in the reference value calculating, the computer sets the reference value so as to follow the calculated tilt value, depending on the calculation of the tilt value.

14. The storage medium according to claim 1, wherein the tilt value is represented as any of an angle value of the input device relative to a reference where a predetermined direction is the reference, a value of a sine function of the angle value, and a value of a cosine function of the angle value.

15. The storage medium according to claim 1, wherein, in the outputting, the computer outputs information about a direction in which the input device has deviated from a direction in which the image capturing device can capture the image of the target object.

16. The storage medium according to claim 1, wherein
the motion-attitude detector comprises an acceleration sensor for sensing an acceleration applied to the input device, and
in the tilt calculating, the computer calculates or acquires the tilt value using a result of detection by the acceleration sensor.

17. An information processing apparatus which can communicate with an input device performing a pointing action by using an image capturing device for capturing an image of a target object, and calculate a pointing position on a screen of a display device based on the image captured by the image capturing device, wherein
the input device comprises a motion-attitude detector configured to detect a motion or an attitude of the input device,
the information processing apparatus comprising a processor configured to:
calculate a tilt value indicating a tilt of the input device using a result of detection by the motion-attitude detector;
determine whether or not the pointing position can be calculated based on the image captured by the image capturing device;
compare the calculated tilt value with a reference value when the pointing position cannot be calculated; and
output information about the tilt of the input device, depending on a result of comparison.

18. The information processing apparatus according to claim 17, wherein
the calculating and the determining repeatedly execute the process of detecting the motion or attitude of the input device and the process of determining whether or not the pointing position can be calculated, and
the information processing apparatus is further configured to:
calculate the reference value based on one or more tilt values calculated when the pointing position can be calculated.

19. The information processing apparatus according to claim 17, wherein the tilt value is represented as any of an angle value of the input device relative to a reference where a predetermined direction is the reference, a value of a sine function of the angle value, and a value of a cosine function of the angle value.

20. The information processing apparatus according to claim 17, wherein information indicating a direction in which the input device is deviated from a direction in which the image capturing device can capture the image of the target object is outputted.

21. The information processing apparatus according to claim 17, wherein
the motion-attitude detector comprises an acceleration sensor for detecting an acceleration applied to the input device, and
the tilt value using a result of detection by the acceleration sensor is calculated.

22. A method of operating an information processing apparatus which can communicate with an input device performing a pointing action by using an image capturing device for capturing an image of a target object, and calculating a pointing position on a screen of a display device based on the image captured by the image capturing device, wherein the input device comprises a motion-attitude detector configured to detect a motion or an attitude of the input device, the method comprising:
- calculating a tilt value indicating a tilt of the input device using a result of detection by the motion-attitude detector;
- determining whether or not the pointing position can be calculated based on the image captured by the image capturing device;
- comparing the calculated tilt value with a reference value when the pointing position cannot be calculated based on the captured image; and
- outputting information about the tilt of the input device based on the comparing.

23. A system comprising at least one information processing apparatus which can communicate with an input device performing a pointing action by using an image capturing device for capturing an image of a target object, and calculate a pointing position on a screen of a display device based on the image captured by the image capturing device, wherein the input device comprises a motion-attitude detector configured to detect a motion or an attitude of the input device, the system comprising:
- a processor configured to:
- calculate a tilt value indicating a tilt of the input device using a result of detection by the motion-attitude detector;
- determine whether or not the pointing position can be calculated based on the image captured by the image capturing device;
- compare the calculated tilt value with a reference value when the pointing position cannot be calculated; and
- output information about the tilt of the input device, depending on a result of comparison.

* * * * *